US012617979B2

(12) United States Patent
Jiang et al.

(10) Patent No.: US 12,617,979 B2
(45) Date of Patent: May 5, 2026

(54) FLAME-RETARDANT DEGRADABLE ADHESIVE TAPE AND PREPARATION METHOD THEREOF

(71) Applicant: Shanghai University of Engineering Science, Shanghai (CN)

(72) Inventors: Zhenlin Jiang, Shanghai (CN); Yun Zhang, Shanghai (CN); Keyu Zhu, Shanghai (CN); Chenxue Xu, Shanghai (CN); Min Zhu, Shanghai (CN); Xin Fan, Shanghai (CN); Jiamin Xu, Shanghai (CN); Wanting Ren, Shanghai (CN)

(73) Assignee: SHANGHAI UNIVERSITY OF ENGINEERING SCIENCE (CN)

( * ) Notice: Subject to any disclaimer, the term of this patent is extended or adjusted under 35 U.S.C. 154(b) by 76 days.

(21) Appl. No.: 18/294,384

(22) PCT Filed: Mar. 23, 2022

(86) PCT No.: PCT/CN2022/082481
§ 371 (c)(1),
(2) Date: Sep. 5, 2024

(87) PCT Pub. No.: WO2023/173457
PCT Pub. Date: Sep. 21, 2023

(65) Prior Publication Data
US 2026/0117097 A1 Apr. 30, 2026

(30) Foreign Application Priority Data
Mar. 18, 2022 (CN) .......................... 202210271623.7

(51) Int. Cl.
C09J 7/38 (2018.01)
C09J 167/06 (2006.01)

(52) U.S. Cl.
CPC ............... C09J 7/38 (2018.01); C09J 167/06 (2013.01); C09J 2301/302 (2020.08);
(Continued)

(58) Field of Classification Search
CPC ...... C09J 7/38; C09J 167/06; C09J 2301/302; C09J 2301/408; C09J 2301/414; C09J 2467/00
See application file for complete search history.

(56) References Cited

U.S. PATENT DOCUMENTS 4,477,636 A * 10/1984 Muroi .................... C09J 167/06
522/27
2013/0137562 A1* 5/2013 Penttinen ................... C09J 5/06
493/148
(Continued)

FOREIGN PATENT DOCUMENTS

CN 113637421 A * 11/2021 ................ C09J 7/30

OTHER PUBLICATIONS

Zhenlin et al, 'Synthesis and properties of biodegradable PBAT prepared from PBT chemically recycled resources', Elsevier—Polymer, vol. 307 (Year: 2024).*
(Continued)

*Primary Examiner* — Michael N Orlando
*Assistant Examiner* — Abhishek A Patwardhan
(74) *Attorney, Agent, or Firm* — Wendi E. Uzar

(57) ABSTRACT

The present disclosure provides a preparation method of a flame-retardant degradable adhesive tape, including: preparing a degradable adhesive tape base layer and a flame-retardant degradable adhesive tape bonding layer separately, and then conducting coating, curing, and aging of the flame-retardant degradable adhesive tape bonding layer on a surface of the degradable adhesive tape base layer to obtain the flame-retardant degradable adhesive tape; where the
(Continued)

10% PBAT

Pure PBAT 8.0 7.5 7.0 6.5 6.0 5.5 5.0 4.5 4.0 3.5 3.0 2.5 2.0 1.5 1.0 0.5 degradable adhesive tape base layer is prepared by subjecting bis(2-hydroxybutyl) terephthalate (BHBT) and bis(2-hydroxybutyl) adipate (BHAT) to transesterification and polycondensation to obtain a degradable poly(butylene adipate-co-terephthalate) (PBAT) polymer polymer, and then conducting blow molding on the degradable PBAT polymer; the flame-retardant degradable adhesive tape bonding layer is prepared by subjecting the BHBT, the BHAT, and a pressure-sensitive adhesive (PSA) additive to transesterification and polycondensation to obtain a colloidal flame-retardant degradable PBAT polymer, and conducting curing on the colloidal flame-retardant degradable PBAT polymer.

20 Claims, 2 Drawing Sheets

(52) U.S. Cl.
CPC .... *C09J 2301/408* (2020.08); *C09J 2301/414* (2020.08); *C09J 2467/00* (2013.01)

(56) References Cited

U.S. PATENT DOCUMENTS

2014/0072782 A1* 3/2014 Chung .................... B32B 27/08
428/195.1
2014/0329065 A1* 11/2014 Chung .................... B32B 27/12
428/207

OTHER PUBLICATIONS

Liu et al, 'Preparation of PBAT Copolyesters with Flame Retardant and Degradable Functions through PBT Chemical Alcoholysis and Closed-Loop Recycling', ACS vol. 12 Issue 47 (Year: 2024).*
Hwang et al, 'Biodegradable Plastics as Sustainable Alternatives: Advances, Basics, Challenges, and Directions for the Future', MDPI, Materials vol. 18 (Year: 2025).*
CN113637421A_machine_translation (Year: 2021).*

* cited by examiner

FLAME-RETARDANT DEGRADABLE ADHESIVE TAPE AND PREPARATION METHOD THEREOF

The present application is a national stage application of International Patent Application No. PCT/CN2022/082481, filed on Mar. 23, 2022, which claims the benefit and priority to the Chinese Patent Application No. 202210271623.7, filed with the China National Intellectual Property Administration (CNIPA) on Mar. 18, 2022, and entitled "FLAME-RETARDANT DEGRADABLE ADHESIVE TAPE AND PREPARATION METHOD THEREOF", which is incorporated herein by reference in its entirety.

TECHNICAL FIELD

The present disclosure belongs to the technical field of adhesive tapes, and relates to a flame-retardant degradable adhesive tape and a preparation method thereof.

BACKGROUND

With the rapid development of express delivery industry, a sharp increase in the consumption of packaging products has brought a huge burden to the society and environment. For example, the express business volume in China in 2018 reached 50.71 billion pieces, and a total of about 43 billion meters of packaging tape was consumed, which could circle the earth 1.077 times. At this stage, most of the adhesive tapes used in the industry are traditional biaxially-oriented polypropylene (BOPP) tapes. The raw materials of these tapes come from petroleum resources, which are non-renewable and are increasingly depleted with the increase in consumption. Moreover, this type of tape cannot be degraded within a short time after use. After completing the packaging mission, the materials used are directly turned into packaging waste. This not only exacerbates white pollution, but also increases a cost of recycling due to the separation of cartons and plastic tapes after packaging. Therefore, to achieve green and sustainable development of the express delivery industry, measures need to start from the source. The green development of packaging has received extensive attention, and degradable properties of the adhesive tapes also need further in-depth research.

The biodegradable adhesive tape is still in an initial research stage, and there is still a certain distance from the commercialization of products based on same. The degradable adhesive tapes cannot completely replace the traditional BOPP tapes in terms of application performance, and also show a production cost much higher than that of the ordinary tapes, thus limiting promotion and application of the degradable adhesive tapes.

An adhesive tape is mainly composed of two parts: a base layer and a bonding layer. The bonding layer is mainly prepare from polymers, and the polymers may be melted or decomposed into unstable flammable substances when being heated. Once encountering a spark, the adhesive tape burns and causes a fire. As a result, flame-retardant adhesive tapes have broad market application prospects. Various inorganic flame retardants such as aluminum hydroxide and zinc borate are cheap, non-volatile, desirable in thermal stability, and less harmful, and have an excellent smoke-suppression effect. However, these inorganic flame retardants are added in a large amount when being used to seriously affect a processing performance of the materials, and show extremely low flame retardancy. Halogenated flame retardants have a desirable flame retardant effect, and cause little influence on the performance of materials due to low volume of addition. However, this type of flame retardant is easy to release corrosive hydrogen halide gas and has a large amount of smoke during use. Phosphorus-based flame retardants have a low volume of addition, and produce phosphoric anhydride or phosphoric acid that is less harmful to the environment during combustion. In addition, the phosphorus-based flame retardants also show low toxicity, smoke generation, and halogen content, as well as high flame retardancy. Organic phosphorus-based flame retardants are suitable for polymerization reactions, and inorganic phosphorus-based flame retardants are generally used for blending. Flame retardant 2-carboxyethylphenylphosphinic acid (CEPPA) is an environmental-friendly reactive (copolymerization-typed) phosphorus-based flame retardant, which is suitable for permanent flame-retardant modification of polyesters. Moreover, the CEPPA is also a main-chain-type flame retardant, and has a phosphonate structure that can greatly reduce its glass-transition temperature (GTT) and improve its viscoelasticity. In this way, excellent pressure-sensitive properties are imparted to the polymers by CEPPA. As for conventional polyester pressure-sensitive adhesives (PSAs), their melting point and GTT are lowered by introducing a highly flexible polyether or long-chain polyol structure, thereby improving pressure-sensitive properties.

Patent CN108003818A disclosed a heat-conducting and low-halogen flame-retardant PSA and a preparation method thereof. An acrylic monomer, an acrylate monomer, and an organic peroxide initiator are mixed to allow polymerization by heating to obtain a polyacrylate adhesive. The polyacrylate adhesive is mixed with a heat-conducting filler and a flame-retardant substance by stirring to obtain a PSA with a desirable heat-conducting ability and an excellent flame-retardant performance. However, organic solvents may pollute the environment; and a large amount of the heat-conducting filler and the flame-retardant substance can cause the PSA to have severely reduced light transmittance, initial adhesion, peel strength, and coating film properties, as well as poor biodegradability.

Patent CN108977116A disclosed a flame-retardant and conductive polyacrylate PSA, a preparation method, and a flame-retardant and conductive adhesive tape. A soft monomer, a hard monomer, a functional monomer, a polymerization solvent, an azo initiator, and an isocyanate crosslinking agent according a specified proportion are heated to allow polymerization to obtain a polyacrylate adhesive. A flame retardant is added into the polyacrylate adhesive to obtain an adhesive tape, such that a halogen-free and less-polluting PSA tape is prepared with conductive and flame-retardant functions. However, organic solvents and non-degradable materials pollute the environment; and a flame retardant ammonium polyphosphate is added in a blended form, has poor biodegradability, and does not form a certain free volume, such that the PSA shows poor initial adhesion and peel strength.

Patent CN110655872A disclosed a halogen-free and flame-retardant UV-curable acrylate PSA, a PSA tape, and a preparation method thereof. An acrylate prepolymer, an acrylic monomer as a functional monomer, a photoinitiator, and a crosslinking agent are mixed to obtain a PSA, and then a flame-retardant monomer is added for blending to obtain a flame-retardant PSA. A PSA tape formed by the halogen-free and flame-retardant UV-curable acrylate PSA has desirable flame-retardant effect, excellent pressure-sensitive adhesive performance, and wide application range. The PSA tape has volatile components close to zero and shows less environmental pollution; and a preparation method of the PSA tape has simple operation, reduced energy consumption, and low cost. However, the materials used are not biodegradable and show a poor degradation performance.

Patent CN101805567A disclosed a method for preparing a phosphorus-bonded flame-retardant acrylate PSA. An acrylate monomer is mixed with a phosphorus-containing monomer, and an initiator is added to conduct a temperature-raising reaction to obtain the phosphorus-bonded flame-retardant acrylate PSA. The phosphorus-bonded flame-retardant acrylate PSA is further added with a flame-retardant slurry and mixed uniformly to improve its flame-retardant performance. The PSA has relatively desirable substrate adhesion, high flame-retardant dispersion, and excellent light transmittance. However, due to a low phosphorus content, the PSA shows common flame retardancy, as well as low initial adhesion and permanent adhesion. Moreover, the PSA contains a small amount of non-volatile solvent inside and has poor biodegradability.

Patent CN102719206A disclosed a preparation method of a halogen-free and environmental-friendly flame-retardant acrylate PSA. Hexachlorocyclotriphosphazene reacts with an alcohol monomer to prepare a phosphorus-containing flame retardant. The phosphorus-containing flame retardant is mixed with a soft monomer, a hard monomer, an initiator, and a crosslinking agent at a certain proportion to allow a reaction, to obtain a target PSA. After curing, the PSA has an initial decomposition temperature increased from 150° C. in the prior art to 200° C. and a char residue rate at 600° C. increased from 0% in the prior art to about 21%, showing desirable thermal stability and char formation. However, the flame retardant is poorly compatible with the PSA. A rigid group of the flame retardant is too large, causing the PSA to have low permanent adhesion and initial adhesion. Moreover, the PSA may remain harmful solvents in its system, and has poor biodegradability.

Patent CN112812725A disclosed a fully-biodegradable PSA and a preparation method thereof. The PSA is prepared by mixing a fully-biodegradable elastomer, a D,L-lactic acid oligomer with a molecular weight of 300 to 600, a D,L-lactic acid oligomer with a molecular weight of 600 to 2.000, a plasticizer, and an antioxidant. A preparation process of the PSA has simple and pollution-free steps, does not use solvents, and is convenient for industrialization. A biodegradable PSA tape prepared by the PSA has high initial adhesion, excellent peel strength, desirable permanent adhesion, and well biodegradability. Specifically, the biodegradable PSA tape has a degradability of up to 93%, an initial adhesion of 17 #, and a 180° peel strength of 14 (N/25 mm). However, the PSA tape does not have flame retardant properties, and shows a poor performance stability since it is prepared by blending.

From the relevant patents reported above, it can be known that flame-retardant adhesive tapes are currently mainly prepared by blending methods. These flame-retardant adhesive tapes have excellent flame-retardant performances, but may pollute the environment and affect a bonding performance of the materials. Meanwhile, biodegradable adhesive tapes have desirable adhesive properties but do not show flame-retardant properties. In view of this, it is necessary to study a kind of degradable adhesive tape. This type of adhesive tape has both excellent flame-retardant properties and strong adhesion, and also meets the requirement that a base film and an adhesive of this adhesive tape are a same type of degradable material and can be reprocessed and recycled. Moreover, the adhesive tape shows a simple preparation process and does not produce toxic and harmful substances.

SUMMARY

In order to overcome the deficiencies of the prior art, an objective of the present disclosure is to provide a flame-retardant degradable adhesive tape and a preparation method thereof. In the present disclosure, waste polybutylece terephthalate (PBT) is subjected to alcoholysis to prepare a raw material regenerated poly(butylene adipate-co-terephthalate) (PBAT), and then a large free-volume flame-retardant segment is introduced into the biodegradable material PBAT. In this way, an integrated design of a base layer and a bonding layer of the adhesive tape is realized, thus achieving multiple recycling and biodegradation.

To achieve the above objective, the present disclosure adopts the following technical solutions:

The present disclosure provides a preparation method of a flame-retardant degradable adhesive tape, including: preparing a degradable adhesive tape base layer and a flame-retardant degradable adhesive tape bonding layer separately; and then conducting coating, curing, and aging of the flame-retardant degradable adhesive tape bonding layer on a surface of the degradable adhesive tape base layer to obtain the flame-retardant degradable adhesive tape; where the degradable adhesive tape base layer is prepared by subjecting BHBT and BHAT to transesterification and polycondensation to obtain a degradable PBAT polymer, and then conducting blow molding on the degradable PBAT polymer:

the flame-retardant degradable adhesive tape bonding layer is prepared by subjecting the BHBT, the BHAT, and a pressure-sensitive adhesive (PSA) additive to transesterification and polycondensation to obtain a colloidal flame-retardant degradable PBAT polymer, and conducting curing on the colloidal flame-retardant degradable PBAT polymer; and the PSA additive is prepared by conducting esterification on 2-carboxyethylphenylphosphinic acid (CEPPA), 1,4-butanediol, and pentaerythritol.

As a preferred technical solution:

In the preparation method of a flame-retardant degradable adhesive tape, a process of conducting the coating, the curing, and the aging of the flame-retardant degradable adhesive tape bonding layer on the surface of the degradable adhesive tape base layer to obtain the flame-retardant degradable adhesive tape includes: coating the flame-retardant degradable adhesive tape bonding layer on the surface of the degradable adhesive tape base layer, conducting the curing by baking at 85° C. to 95° C. for 2 min to 4 min. laying a release film on a surface of the flame-retardant degradable adhesive tape bonding layer, and conducting the aging in a warm room at 45° C. to 55° C. for 23 h to 25 h to obtain the flame-retardant degradable adhesive tape; during preparing the adhesive tape, the bonding layer of the adhesive tape needs to be cured and aged to make a structure of the bonding layer more stable, thus improving and maintaining a longer-term adhesive performance; where the release film is an organic silicone oil material;

the release film has a thickness of 0.1 μm to 8 μm;

the degradable adhesive tape base layer has a thickness of 10 μm to 60 μm; and the flame-retardant degradable adhesive tape bonding layer has a thickness of 3 μm to 50 μm.

In the preparation method of a flame-retardant degradable adhesive tape, the BHBT is regenerated BHBT prepared by conducting alcoholysis and filtration on a waste poly-butylece terephthalate (PBT) material as a raw material;

the alcoholysis is conducted with sodium phytate or potassium phytate as a complexant; the complexant has a strong ability to integrate metal ions in a wide pH range, and at the same time, phytic acid and its salts show certain anti-aging properties. In this way, a progress of the complexation can be ensured under high temperature conditions, thus removing metal ions. The monovalent metal ions, sodium ions or potassium ions introduced in the complexant can promote the intra-molecular association, and a small amount of addition can promote the subsequent polymerization to a certain extent. However, conventional metal ion complexants such as EDTA have poor heat resistance and stability, and —NH$_2$ in its molecular structure may lead to the decomposition of alcoholysis products (the amino groups in EDTA are in a basic structure, which can lead to alkali hydrolysis of polyesters. In addition, an amino structure itself may react with a carboxylic acid structure to form an amide compound, which may eventually affect the polymerization of polyesters).

The regenerated BHBT has a residual metal ion content of less than 30 ppm, where a residual content of divalent metal ions is 5 ppm to 25 ppm, and a residual content of trivalent metal ions is 1 ppm to 5 ppm.

In the preparation method of a flame-retardant degradable adhesive tape, the waste PBT material has polyurethane (PU) with a mass fraction of less than 5% and polyethylene terephthalate (PET) with a mass fraction of less than 10%.

The waste PBT material comes from scraps of injection molded parts for vehicles (PBT for plastics) and scraps of textiles (PBT for fibers). The scraps of injection molded parts for vehicles (PBT for plastics) have a PBT content of greater than 60%, and the scraps of textiles (PBT for fibers) generally have a PBT content of greater than 90%. The waste PBT material is generally blended and modified with other plastic substrates, such as polyethylene terephthalate (PET), polyurethane (PU), nylon, and polycarbonate. The nylon and the polycarbonate are not alcoholyzed in the alcoholysis and can be removed by filtration. However, the PET and the PU are alcoholyzed in the alcoholysis, and resulting dissolved products may affect the further polymerization of a PBT alcoholysis product. Therefore, in the present disclosure, the waste PBT material has preferably polyurethane (PU) with a mass fraction of less than 5% and polyethylene terephthalate (PET) with a mass fraction of less than 10%.

In the preparation method of a flame-retardant degradable adhesive tape, the alcoholysis includes: under nitrogen protection, dissolving the waste PBT material, the 1,4-butane-diol, a catalyst, an anti-aging agent, and an ether inhibitor in a reactor at 180° C. to 210° C. to obtain a system; after the system is clarified, gradually heating to 200° C. to 240° C. to allow a reaction for 1.5 h to 2.5 h; recording a water output, and conducting vacuumizing at a vacuum degree of 200 Pa to 1.000 Pa for 20 min to 60 min when the water output reaches 90% of a theoretical value; and adding the complexant to allow a reaction for 15 min to 30 min (the complexant is added at this stage because during the alco-holysis, the first discarded PBT particles are solid, while 1,4-butanediol is liquid; metal ion impurities are mainly in the discarded PBT particles, so it is first necessary to conduct alcoholysis on the PBT particles to form a homogeneous system, followed by complexation with the complexant to form precipitates, and the precipitates are removed by fil-tration; in addition, adding a complexant at this stage can ensure that the front-end alcoholysis is not affected; and before the next step of polymerization, the complexed metal ions are filtered to obtain the BHBT), and conducting filtration to obtain the regenerated BHBT: there are metal ions in waste products, especially high-valence metal ions that affect alcoholysis and polycondensation: therefore, it is necessary to remove heavy metal ions: in addition, the alcoholysis is conducted at high temperatures, and conven-tional complexants are difficult to withstand the high tem-peratures: while a structure of the conventional complexant itself is not suitable for the complexation of an alcoholysis system, thus seriously affecting the quality of alcoholysis and condensation; moreover, the complexation of phytic acid with metal ions must be conducted in a melt or liquid environment, and corresponding phytic acid and its salts have high temperature resistance: it is especially important that there should be a stable phosphate structure, which does not affect the alcoholysis of polyesters under high tempera-tures; where the waste PBT material and the 1,4-butanediol are at a mass ratio of 1:0.30 to 1:0.50;

the catalyst is selected from the group consisting of zinc acetate, aluminum acetate, and calcium acetate;

the catalyst has a mass 0.025 wt % to 0.15 wt % that of the waste PBT material;

the anti-aging agent is selected from the group consisting of triphenyl phosphate, trimethyl phosphite, and tri-ethyl phosphite;

the anti-aging agent has a mass 0.075 wt % to 0.25 wt % that of the waste PBT material;

the ether inhibitor is selected from the group consisting of sodium acetate and magnesium acetate;

the ether inhibitor has a mass 0.1 wt % to 0.25 wt % that of the waste PBT material; and the complexant has a mass 0.02 wt % to 0.05 wt % that of the waste PBT material.

In the preparation method of a flame-retardant degradable adhesive tape, the waste PBT material is further subjected to a pretreatment before the alcoholysis; and the pretreatment includes: processing the waste PBT material to obtain a PBT powder with a particle size of less than 2 mm, sieving, and drying a resulting sieved PBT powder in a vacuum oven at 100° C. to 130° C. for 8 h to 12 h.

In the preparation method of a flame-retardant degradable adhesive tape, a preparation process of the BHAT includes: under nitrogen protection, allowing adipic acid and the 1,4-butanediol with a molar ratio of 1:1.05 to 1:1.45 to have esterification in a reactor at 180° C. to 200° C. for 2 h to 4 h; recording a water output, and detecting an acid value when the water output reaches 90% of a theoretical value; and terminating the esterification when the acid value reaches 20 KOH mg/g to 40 KOH mg/g to obtain the BHAT.

In the preparation method of a flame-retardant degradable adhesive tape, a preparation process of the PSA additive includes: under nitrogen protection, conducting alcoholysis on the CEPPA, the 1,4-butanediol, a catalyst, an anti-aging agent, and an ether inhibitor in a reactor at 140° C. to 160° C.; after a resulting system is clarified, adding pentaeryth-ritol to allow a reaction for 2 h to 4 h; gradually heating to 170° C. to 230° C. and recording a water output; and conducting vacuumizing at a vacuum degree of 300 Pa to 900 Pa for 30 min to 60 min when the water output reaches 90% of a theoretical value to obtain the PSA additive; where the CEPPA and the 1,4-butanediol are at a molar ratio of 1:1.10 to 1:1.40;

the 1,4-butanediol and the pentaerythritol are at a molar ratio of 1:1.2 to 1:1.3;

the catalyst is selected from the group consisting of zinc acetate, aluminum acetate, and calcium acetate;

the catalyst has a mass 0.025 wt % to 0.15 wt % that of the CEPPa;

the anti-aging agent is selected from the group consisting of triphenyl-phosphite phosphate, trimethyl phosphite, and triethyl phosphite;

the anti-aging agent has a mass 0.075 wt % to 0.25 wt % that of the CEPPA;

the ether inhibitor is selected from the group consisting of sodium acetate and magnesium acetate;

the ether inhibitor has a mass 0.1 wt % to 0.25 wt % that of the CEPPA.

In order to improve the pressure-sensitive properties of materials, the glass-transition temperature (GTT) and melting point of the substrate need to be greatly reduced. In the prior art, conventional copolyester modification, such as CEPPA and polyol structure in flame retardancy and hydrophilic modification, may greatly reduce the melting point and GTT. To impart pressure-sensitive properties to polyester materials, it is necessary to introduce a structure with large steric hindrance as well as a monomer with a highly flexible free volume in the substrate. Pentaerythritols have relatively large steric hindrance, and a hydroxyl structure in their molecular structure has the same activity. Meanwhile, pentaerythritols can form a freely rotating tetrahedral structure during the reaction, and have a free volume that can be rotatable in space. However, the CEPPA itself is a solid with a high melting point, while the pentaerythritol is also a solid powder, which is difficult to directly react with the CEPPA, and sublimation of the pentaerythritol may occur. As a result, esterification between CEPPA and BDO is conducted first to form a low-viscosity esterified product, and then the pentaerythritol is dissolved in the esterified product. In this way, a solid-liquid reaction interface is reduced, thereby promoting the transesterification and forming a PSA additive with high flexibility and large free volume.

In the preparation method of a flame-retardant degradable adhesive tape, a preparation process of the degradable adhesive tape base layer includes:

(1) under nitrogen protection, dissolving the BHBT, the BHAT, and a condensation catalyst according a specified proportion in a reactor at 200° C. to 210° C. for 15 min, and gradually heating to 225° C. to 235° C. to allow a reaction for 1 h to 1.5 h; recording a water output, and heating to 250° C. to 265° C. to allow high-temperature polycondensation at a vacuum degree of 50 Pa to 1,000 Pa for 3.5 h to 5.5 h when the water output reaches 90% of a theoretical value, to obtain the degradable PBAT polymer; where the BHBT and the BHAT are at a molar ratio of 40:60 to 50:50;

the condensation catalyst is a composite catalyst of poly (antimony ethylene glycoxide) and tetrabutyl titanate, and the poly(antimony ethylene glycoxide) and the tetrabutyl titanate are at a mass ratio of 1:0.25 to 1:0.85; and the condensation catalyst is added at 0.01 wt % to 0.06 wt % of the BHAT; and Phosphorus-based flame retardants have high flame retardant efficiency, and low corrosion during processing and combustion, and show little influence on light stability or the effect of light stabilizers. However, in the existing industrial production technology, the polycondensation is generally difficult since phosphorus-based flame retardants are added in the reaction. Solid-state polycondensation must be conducted to obtain PBAT with higher molecular weight, which increases production cost and energy consumption. However, the preparation of the flame-retardant degradable PBAT polymer in the present disclosure does not involve the solid-state polycondensation to obtain high-molecular-weight PBAT, thus saving production costs and showing high economic benefits. This is because a composite catalyst, tetrabutyl titanate-poly(antimony ethylene glycoxide), is used in the present disclosure, so as to avoid slow molecular weight growth and difficult repolymerization caused by the large difference in a polycondensation effect or an esterification effect of a single catalytic system. Titanium-based catalysts have a desirable catalytic effect on the esterification, while poly(antimony ethylene glycoxide) is an efficient catalyst during the polycondensation. The above two are used as a composite catalyst, such that a PBAT copolyester with a high weight-average molecular weight can be obtained;

(2) subjecting the degradable PBAT polymer to blow molding at 160° C. to 180° C. and a blow-up ratio of (3-6):1 in a film blowing machine with a die gap of 10 μm to 50 μm, to obtain a regenerated PBAT polymer film as the degradable adhesive tape base layer.

In the preparation method of a flame-retardant degradable adhesive tape, a preparation process of the flame-retardant degradable adhesive tape bonding layer includes:

(1) under nitrogen protection, dissolving the BHBT, the BHAT, the PSA additive, and a condensation catalyst according a specified proportion in a reactor at 190° C. to 210° C. for 20 min, and gradually heating to 220° C. to 240° C. to allow a reaction for 1 h to 2 h; recording a water output, and heating to 245° C. to 250° C. to allow high-temperature polycondensation at a vacuum degree of 200 Pa to 600 Pa for 2.5 h to 4.5 h when the water output reaches 90% of a theoretical value, to obtain the colloidal flame-retardant degradable PBAT polymer; the synthesized bonding layer needs a smaller molecular weight and needs to be viscous; the high addition of CEPPA can reduce a molecular weight of flame retardant PBAT and make the system into a viscous liquid; moreover, it is necessary to control the temperature not to be too high and the time not to be too long during the synthesis, otherwise it may cause aging degradation; where the BHBT, the BHAT, and the PSA additive are at a molar ratio of 35:50:15 to 20:50:30;

the condensation catalyst is a composite catalyst of poly (antimony ethylene glycoxide) and tetrabutyl titanate, and the poly(antimony ethylene glycoxide) and the tetrabutyl titanate are at a mass ratio of 1:0.25 to 1:0.85; and the condensation catalyst is added at 0.01 wt % to 0.06 wt % of the BHAT; and (2) aging the colloidal flame-retardant degradable PBAT polymer at 40° C. to 60° C. and allowing to stand for 1 h to 1.5 h to obtain the flame-retardant degradable adhesive tape bonding layer.

The present disclosure further provides a flame-retardant degradable adhesive tape prepared by the preparation method, including a degradable adhesive tape base layer and a flame-retardant degradable adhesive tape bonding layer; where the degradable adhesive tape base layer has a tensile strength of greater than or equal to 20) MPa:

the flame-retardant degradable adhesive tape bonding layer has a number-average molecular weight of 6.000 to 12.000, a glass-transition temperature (GTT) of −25° C. to 0° C., a viscoelastic range of −25° C. to 72° C. a complex viscosity $\eta^*$ of 14 Pa·s to 30 Pa·s, an initial adhesion of greater than or equal to 20 #, a permanent adhesion of greater than or equal to 30 h. and a 180° peel strength of greater than or equal to 5 N/cm under normal conditions (the "normal conditions" mean that when testing the 180° peel strength, the adhesive tape needs to be placed for more than 2 h at an experimental temperature of 25±2° C. and a relative humidity of 50% to 80%, and the adhesive tape has a width of 25.4 mm and a length of 360 mm); and the flame-retardant degradable adhesive tape has a limiting oxygen index of 28% to 45%, a flame-retardant grade of UL94 VTM-0), and a 90-day biodegradation rate of 50% to 90%.

Current adhesive tapes have complex production processes and are generally not biodegradable, causing a great burden on the environment. In the present disclosure, not only the flame-retardant degradable adhesive tape has excellent flame-retardant performance, but also its adhesive tape base layer and adhesive tape bonding layer are essentially waste PBT-alcoholyzed regenerated PBAT polymers. Therefore. PBAT materials in different states can be obtained only by controlling a proportion of the PSA additive added during the synthesis. This greatly simplifies the preparation of the flame-retardant adhesive tape. In addition, the degradable adhesive tape base layer and the flame-retardant degradable adhesive tape bonding layer themselves are biodegradable polymers, and use organic silicone oil as a release film. The organic silicone oil with a lower molecular weight can be directly degraded in the environment, and high-molecular organic silicone oil can be degraded in a few weeks after being absorbed in the soil. Accordingly, the flame-retardant adhesive tape can be completely degraded by microorganisms, thereby meeting a current market demand for environmental-friendly and degradable adhesive tapes in the express packaging industry.

The present disclosure is based on the following principle:

CEPPA is used as a flame retardant to modify a main chain of the PBAT molecule, and has stable flame-retardant properties. Moreover, the CEPPA can thermally degrade to generate phosphoric acid and other substances during the combustion, to absorb heat and inhibit the combustion. After a flame-retardant performance test, it can be proved that the obtained product does have excellent performances.

The pressure-sensitive properties and adhesiveness of PSA itself are the most important properties. At present, polyester-type hot-melt PSA is mainly prepared by dibasic acid and polyol, and has poor biodegradability. Meanwhile, a highly crystalline structure of dibasic acid and polyol itself leads to a small difference in melting point and GTT of PSA, as well as poor viscoelastic properties. Therefore, by introducing a variety of long-chain flexible polyether polyols and long-chain alkane polyols for modification. PSA is endowed with pressure-sensitive properties. However, the PSA at this time shows poor degradability, is difficult to meet the requirements of biodegradability, and is even more difficult to realize the use requirements of flame retardancy while having degradable and pressure-sensitive properties. Moreover, in the phosphorus-containing copolymerization modification methods of the prior art, copolyesters used have poor viscoelasticity and pressure sensitivity, and the phosphate ester structure has biotoxicity, which can affect the biodegradability of the material. CEPPA, as a main chain structure, contains phosphate groups, has high polarity and desirable viscosity, and can be hydrolyzed. Moreover, the CEPPA itself can be used as a nutrient structure for bacteria, which has little influence on its biodegradable performance.

CEPPA, as a commonly used main-chain-type flame-retardant modifier, can reduce the GTT and melting point of polyesters. In the present disclosure, a pentaerythritol structure is structurally introduced into the CEPPA. The pentaerythritol has relatively large steric hindrance and a rotatable free volume. After controlling an addition ratio of the pentaerythritol, the molecular chain has high flexibility and large free volume. This provides a certain space thickness and a certain strength for the bonding layer, namely well elasticity. The viscosity of the bonding layer is mainly provided by polar groups of the pentaerythritol and CEPPA. When the adhesive tape is under a certain pressure, some of the internal polar groups may be extruded from the bonding layer due to high flexibility and large free volume of the molecular chain, thereby increasing a bonding density between the polar groups and an adherend, and providing desirable viscosity. Therefore, this method can ensure that the bonding layer has excellent viscoelasticity, namely the pressure-sensitive properties.

Conventional additive-type flame retardants are incorporated into the adhesive tape substrate. Uneven dispersion of flame retardants in the substrate can affect the strength of adhesive tapes and binders. Moreover, this factor may also cause the migration of phosphorus-containing flame retardants to inhibit their biological activity, resulting in a decrease in their biodegradability. In the present disclosure, the CEPPA flame retardant, as a main-chain-type flame retardant, has high flame retardant efficiency. Moreover. CEPPA acts as a main chain structure, which produces the degradation of molecular segments; during the degradation, the phosphate groups of CEPPA can also be hydrolyzed first. A phosphoric acid structure after hydrolysis has an effect of accelerating the degradation of chain segments (in the mechanism of biodegradation, an acidic structure produced by microorganisms first acts on ester groups to cause their hydrolysis, and then the microorganisms absorb the polyols and polyacids produced by hydrolysis to grow rapidly; and a hydrolysis rate of a phosphonate structure in polyesters is higher than that of the polyesters, such that the phosphonate structure can accelerate a degradation efficiency. The pentaerythritol structure has a large steric hindrance and a free volume that can be rotated in space. After a PBAT chain segment is introduced after polymerization with CEPPA, a molecular chain in the bonding layer of the adhesive tape is highly flexible and the bonding layer has a large freedom. This shortens the time for microorganisms to enter materials, and there is enough space for more microorganisms to accelerate degradation. In addition, during the degradation, the initial ester groups are hydrolyzed first, and the molecular chain segment is reduced. This stage takes a long time, and the phosphoric acid structure produced by hydrolysis is easily attacked and absorbed by microorganisms, such that the length of the molecular chain segment continues to decrease, and then the microorganisms are easy to enter the interior of material to conduct degradation, forming a virtuous circle, and the degradation rate of the chain segment can be accelerated). Meanwhile, as a phosphorus-containing element grown by microorganisms, the CEPPA can be absorbed by microorganisms, thereby promoting the biodegradation. The conventional additive-type flame retardants, as phosphate particle structures, are difficult to be bioabsorbed and degraded, so they can inhibit the biological activity (the phosphate particle structure is a bulk structure, where ester groups are protected in the structure, and only a small part of which is exposed to the attack of microorganisms, so they are not easy to be degraded. However, the phosphate groups are not coated and exposed to the attack of microorganisms. In contrast, the degradation becomes faster).

Current flame-retardant adhesive tapes have complex production processes and are generally not biodegradable, causing a great burden on the environment. In the present disclosure, not only the flame-retardant degradable adhesive tape has excellent flame-retardant performance, but also its adhesive tape base layer and adhesive tape bonding layer are essentially waste PBT-alcoholyzed regenerated PBAT polymers. Therefore, the PBAT materials in different states can be obtained only by controlling a proportion of the PSA additive added during the synthesis. This greatly simplifies the preparation of the flame-retardant adhesive tape. In addition, the degradable adhesive tape base layer and the flame-retardant degradable adhesive tape bonding layer themselves are biodegradable polymers, and use organic silicone oil as a release film. The organic silicone oil with a lower molecular weight can be directly degraded in the environment, and high-molecular organic silicone oil can be degraded in a few weeks after being absorbed in the soil. Accordingly, the flame-retardant adhesive tape can be completely degraded by microorganisms, thereby meeting a current market demand for environmental-friendly and degradable adhesive tapes in the express packaging industry.

The present disclosure has the following beneficial effects:

(1) The present disclosure provides a preparation method of a flame-retardant degradable adhesive tape. In the reuse of waste PBT, fully biodegradable PBAT materials and flame-retardant PBAT materials are prepared by chemical alcoholysis and repolymerization, so as to realize the recycling of traditional materials and the low-carbon and green protection of the environment. This solves the problems that the existing waste PBT recovery and reproduction methods are single, and the recycled products are not degradable and functionally modified.

(2) In the present disclosure, the flame-retardant degradable adhesive tape has a high adhesive force and an excellent flame-retardant performance, and is prepared from waste PBT engineering plastics-derived raw materials. Moreover, the flame-retardant degradable adhesive tape is biodegradable and has broad market application prospects.

(3) In the preparation method of a flame-retardant degradable adhesive tape of the present disclosure, the problem that plastics containing impurities are difficult to recycle and reuse is solved by recycling waste PBT materials. In particular, a method of chemical alcoholysis and repolymerization realizes the preparation of degradable polymer materials from traditional non-degradable polymer materials.

(4) In the preparation method of a flame-retardant degradable adhesive tape of the present disclosure, waste PBT materials are subjected to alcoholysis to obtain regenerated BHBT. This can greatly reduce a dosage of raw materials PTA and BDO, thereby effectively reducing a production cost of PBAT to significantly improve economic benefits.

(5) The present disclosure provides a preparation method of a flame-retardant degradable adhesive tape. In the reuse of waste PBT, fully biodegradable PBAT materials are prepared by chemical alcoholysis and repolymerization, so as to realize the recycling of traditional materials and the low-carbon and green protection of the environment. This solves the problems that the existing waste PBT recovery and reproduction methods are single, and the recycled products are not degradable.

(6) In the preparation method of a flame-retardant degradable adhesive tape of the present disclosure, the bonding layer and the base layer of the adhesive tape have a same biodegradable material, thereby realizing integrated recycling of the adhesive tape. This avoids the fact that the existing adhesive tape base layer and the bonding layer show large differences in material components and are difficult to integrate and recycle.

DETAILED DESCRIPTION OF THE EMBODIMENTS

Figure 1:
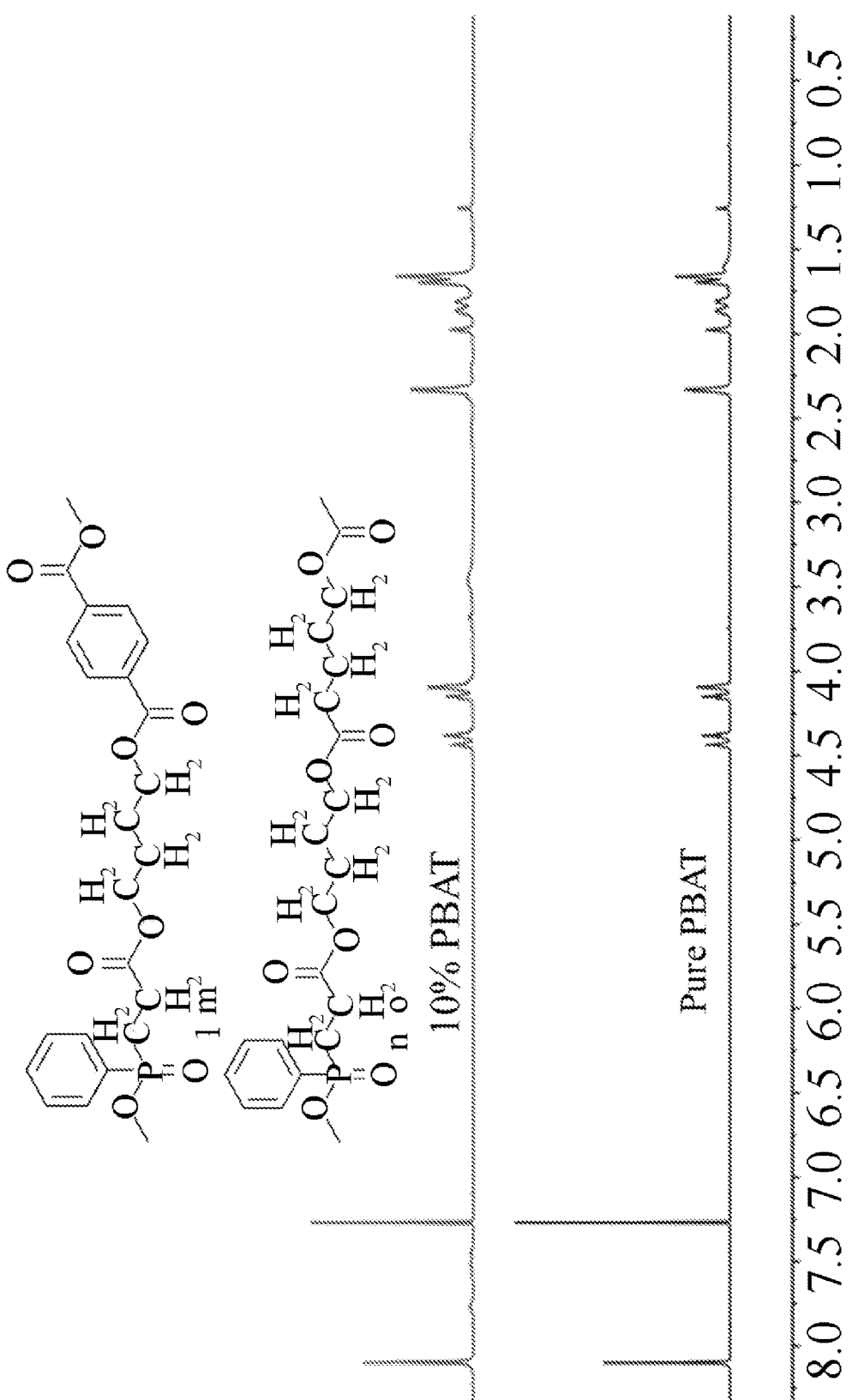
FIG. 1 shows a nuclear magnetic spectrum of a bonding layer in Example 1 of the present disclosure.

The present disclosure will be further described below with reference to specific implementations. It should be understood that these embodiments are only intended to describe the present disclosure, rather than to limit the scope of the present disclosure. In addition, it should be understood that various changes and modifications may be made on the present disclosure by those skilled in the art after reading the content of the present disclosure, and these equivalent forms also fall within the scope defined by the appended claims of the present disclosure.

In following each example, the test methods of technical parameters are as follows:

The tensile strength is tested according to a plastic tensile test method referring to the ASTM D-638 standard, in which a sample has a length of (125±0.5) mm, a width of (13.0±0.5) mm, and a thickness of (4.0±0.5) mm.

The number-average molecular weight is determined using a 410-type gel permeation chromatograph from Waters Corporation of the United States, where a mobile phase is tetrahydrofuran, the flow rate is 1 mL/min, and polystyrene is used as a standard sample for determination.

The initial adhesion is measured according to a method A in "Test method for tack of pressure sensitive adhesive tapes by rolling ball" (GB/T 4852-2002), where a slope is inclined at 30°.

The permanent adhesion is measured according to a method A in "Measurement of static shear adhesion for adhesive types" (GB/T 4851-2014), where an adhesive tape sample has a width of (24±0.5) mm and a length of (12±0.5) mm on a bonding surface of a steel plate: a counterweight has a mass of (1000±5) g.

The 180° peel strength under normal conditions is measured according to "Measurement of peel adhesion properties for adhesive tapes" (GB/T 2792-2014).

The limiting oxygen index is determined according to "Plastics-Determination of flammability by oxygen index" (GB/T2406-93).

A flame-retardant test method includes: preparing the adhesive tape into a sample with a length of (200±5) mm and a width of (50±1) mm, and rolling the sample into a cylinder with a diameter of 13 mm along a longitudinal axis: making a mark 125 mm from one end of the cylinder and sticking with the PSA above the mark (75 mm overlap in length); and conducting the measurement according to UL94 standard with an AUTO-SPA horizontal and vertical tester.

The 90-day biodegradation rate is determined according to "Determination of the ultimate aerobic biodegradability of plastic materials under controlled composting conditions. Method by analysis of evolved carbon dioxide. Part 1: General method" (GB/T 19277.1-2011).

Metal element content analysis: a content of metal ions in the BHBT material is measured by an inductively-coupled plasma (ICP) spectrometer.

Viscoelasticity measurement: by "JYT 0590-2020, General rule of measurement method for rotating rheometer".

GTT and crystallization temperature: by using a differential scanning calorimeter. A certain amount of sample (5 mg) is added into an aluminum crucible and sealed with a cover; under $N_2$ atmosphere, the first scanning is to increase from a room temperature to 200° C. at 10° C./min, and hold for 5 min to eliminate thermal history; the temperature is reduced to −50° C. at 10° C./min; and the temperature is raised to 200° C. again at 10° C./min.

In the present disclosure, the waste PBT material comes from scraps of injection molded parts for vehicles (PBT for plastics) or scraps of textiles (PBT for fibers); and the waste PBT material in Examples 1 to 4 has PU with a mass fraction of 2% and PET with a mass fraction of 3%. The scraps of textiles are provided by Wuxi Xingsheng New Material Technology Co., Ltd. PBT textile waste has main indicators as follows: an intrinsic viscosity of 1.25 dL/g, and a terminal carboxyl content of 15 mmol/kg. The scraps of injection molded parts for vehicles are provided by Jiangsu Kingfa SCI % TECH Co., Ltd. The scraps are derived from window motor casings and automobile bumpers, and have an intrinsic viscosity of 1.30 dL/g, a terminal carboxyl content of 20 mmol/kg, and a melt index of 18 g/min.

Example 1

A preparation method of a flame-retardant degradable adhesive tape included the following steps:

(1) Treatment of Waste PBT

A recovered waste PBT material was pulverized to obtain a PBT powder with a particle size of less than 2 mm, sieved, and dried in a vacuum oven at 100° C. for 12 h.

(2) Preparation of Regenerated BHBT

Under nitrogen protection, the PBT powder, 1,4-butanediol, zinc acetate, triphenyl phosphate, and sodium acetate were added to a reactor, and dissolved at 180° C. to obtain a system; after the system was clarified, a temperature was gradually raised to 200° C. to allow a reaction for 1.5 h. A water output was recorded, and vacuumizing was conducted at a vacuum degree of 1,000 Pa for 20 min when the water output reached 90% of a theoretical value. The sodium phytate was added to allow a reaction for 15 min, unreacted substances were removed by filtration while hot, to obtain the regenerated BHBT, and a residual content of metal ions was measured in the regenerated BHBT. The PBT powder and the 1,4-butanediol were at a mass ratio of 1:0.30; the zinc acetate had a mass 0.025 wt % that of the PBT powder; the triphenyl phosphate had a mass 0.075 wt % that of the PBT powder; the sodium acetate had a mass 0.1 wt % that of the PBT powder; the sodium phytate had a mass 0.02 wt % that of the PBT powder; and the regenerated BHBT had a total residual metal ion content of 30 ppm, including 25 ppm of divalent ions and 5 ppm of trivalent ions.

(3) Preparation of BHAT

Under nitrogen protection, the adipic acid and the 1,4-butanediol were allowed to have esterification in a reactor at 180° C. for 2 h. A water output was recorded, and an acid value was detected when the water output reached 90% of a theoretical value; and the esterification was terminated when the acid value reached 20 KOH mg/g to obtain the BHAT. The adipic acid and the 1,4-butanediol were at a molar ratio of 1:1.05.

(4) Preparation of PSA Additive

Under nitrogen protection, the alcoholysis was conducted on the CEPPA, the 1,4-butanediol, zinc acetate, triphenyl phosphate, and sodium acetate in a reactor at 140° C. After a resulting system was clarified, pentaerythritol was added to allow a reaction for 2 h. The system was gradually heated to 170° C. to allow a reaction for another 4 h, and a water output was recorded. The vacuumizing was conducted at a vacuum degree of 900 Pa for 30 min when the water output reached 90% of a theoretical value to obtain the PSA additive. The CEPPA and the 1,4-butanediol were at a molar ratio of 1:1.10; the 1,4-butanediol and the pentaerythritol were at a molar ratio of 1:1.30; the zinc acetate had a mass 0.025 wt % that of the CEPPA; the triphenyl phosphate had a mass 0.075 wt % that of the CEPPA; and the sodium acetate had a mass 0.1 wt % that of the CEPPA.

(5) Preparation of Degradable Adhesive Tape Base Layer

Under nitrogen protection, the regenerated BHBT, the BHAT, and a composite catalyst of poly(antimony ethylene glycoxide) and tetrabutyl titanate according a specified proportion were dissolved in a reactor at 200° C. for 15 min, and gradually heated to 225° C. to allow a reaction for 1 h. A water output was recorded, and the system was heated to 250° C. to allow high-temperature polycondensation at a vacuum degree of 1,000 Pa for 3.5 h when the water output reached 90% of a theoretical value, to obtain a degradable PBAT polymer. The degradable PBAT polymer was subjected to blow molding at 160° C. and a blow-up ratio of 3:1 in a film blowing machine with a die gap of 10 μm, to obtain a regenerated PBAT polymer film as the degradable adhesive tape base layer. The BHBT and the BHAT were at a molar ratio of 40:60; the composite catalyst of poly(antimony ethylene glycoxide) and tetrabutyl titanate was added at 0.01 wt % of the BHAT, and poly(antimony ethylene glycoxide) and tetrabutyl titanate in the composite catalyst of poly(antimony ethylene glycoxide) and tetrabutyl titanate were at a mass ratio of 1:0.25.

(6) Preparation of Flame-Retardant Degradable Adhesive Tape Bonding Layer

Under nitrogen protection, the regenerated BHBT, the BHAT, the PSA additive, and a composite catalyst of poly (antimony ethylene glycoxide) and tetrabutyl titanate according a specified proportion were dissolved in a reactor at 190° C. for 20 min, and gradually heated to 220° C. to allow a reaction for 1 h. A water output was recorded, and the system was heated to 245° C. to allow high-temperature polycondensation at a vacuum degree of 600 Pa for 2.5 h when the water output reached 90% of a theoretical value, to obtain a colloidal flame-retardant degradable PBAT polymer. The colloidal flame-retardant degradable PBAT polymer was dried in a blast oven at 40° C. for 1 h to obtain a PBAT glue as the flame-retardant degradable adhesive tape bonding layer. The BHBT, the BHAT, and the PSA additive were at a molar ratio of 35:50:15; the composite catalyst of poly(antimony ethylene glycoxide) and tetrabutyl titanate was added at 0.01 wt % of the BHAT, and poly(antimony ethylene glycoxide) and tetrabutyl titanate in the composite catalyst of poly(antimony ethylene glycoxide) and tetrabutyl titanate were at a mass ratio of 1:0.25.

(7) Preparation of the Flame-Retardant Degradable Adhesive Tape

The flame-retardant degradable adhesive tape bonding layer was coated on the surface of the degradable adhesive tape base layer, the curing was conducted by baking at 85° C. for 4 min. a release film was laid on a surface of the flame-retardant degradable adhesive tape bonding layer, and the aging was conducted in a warm room at 45° C. for 25 h to obtain the flame-retardant degradable adhesive tape. The release film was an organic silicone oil material; the release film had a thickness of 8 μm; the degradable adhesive tape base layer had a thickness of 60 μm; and the flame-retardant degradable adhesive tape bonding layer had a thickness of 3 μm.

The NMR spectrum of flame-retardant PBAT after alcoholysis and repolymerization was shown in FIG. 1. The resonance peak at δ=7.266 ppm corresponded to the peak of $CDCl_3$. The peak at δ=8.099 ppm corresponded to the hydrogen atom peak (g) on the benzene ring of PTA, proving the structure of the benzene ring. The peaks at δ=4.092-4.437 ppm corresponded to the proton peaks of the hydrogen atoms of the two methylene groups (a) ligated to the oxygen atoms on BDO. The doublet at δ=2.329-2.337 pmm corresponded to the proton (c) peak in AA near the carboxyl terminus. The proton peaks at δ=1.696-1.977 ppm corresponded to the hydrogen atoms on the two methylene groups (b) in the middle of BDO, proving that a material with a PBAT segment structure had been synthesized. The multiple proton peaks at δ=7.445-7.783 ppm were hydrogen proton peaks of the benzene ring on the flame retardant unit. The peak around δ=3.457 ppm was due to the asymmetry of the flame retardant structure. δ=2.464 and δ=2.696 were hydrogen proton peaks of methylene on the flame retardant unit. This showed that the flame retardant was attached to the PBAT chain segment, indicating that the flame retardant PBAT copolyester was synthesized.

Figure 2:
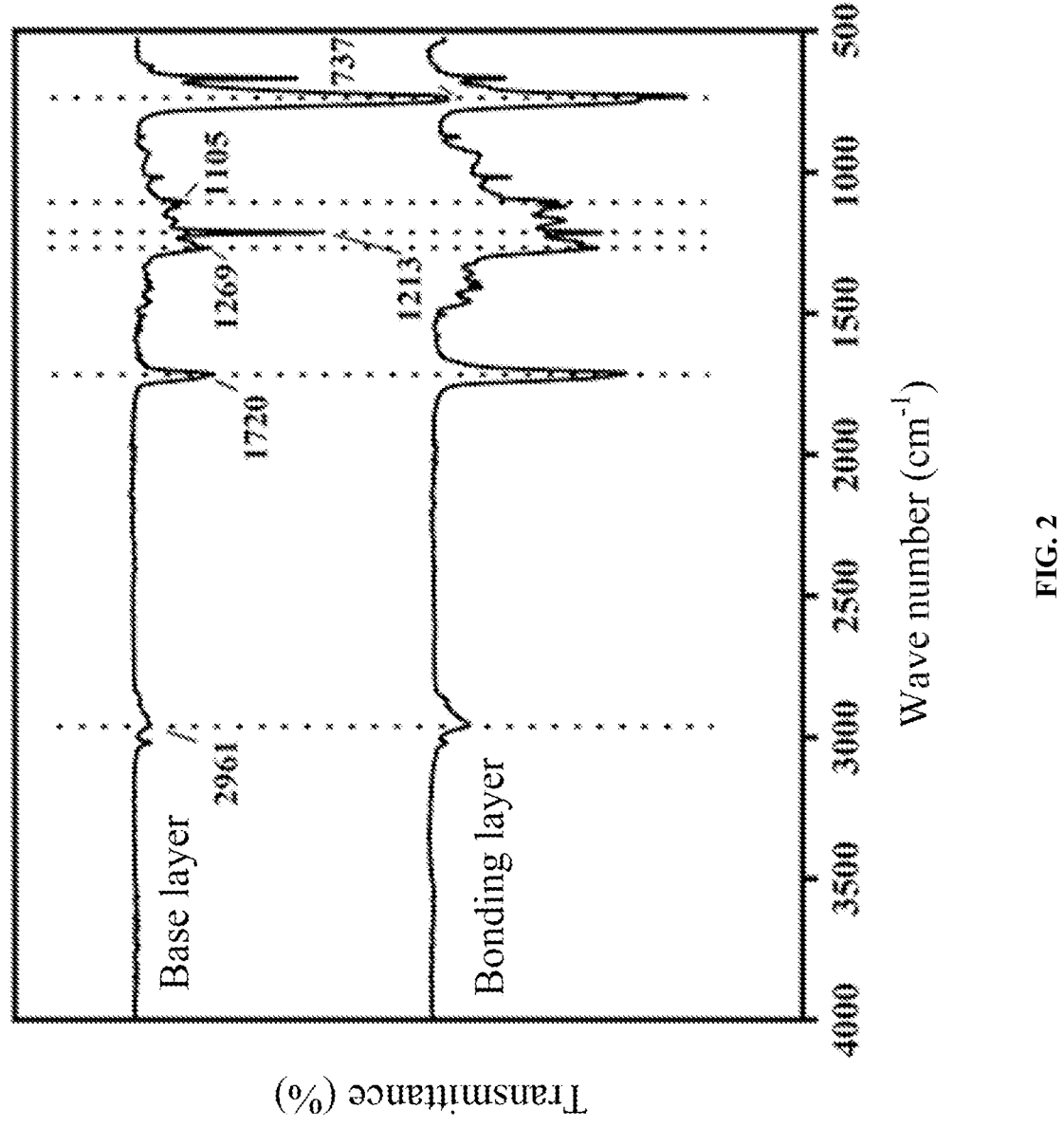
FIG. 2 shows an infrared spectrum of the bonding layer in Example 1 of the present disclosure.

The infrared spectrum of flame-retardant PBAT after alcoholysis and repolymerization was shown in FIG. 2. The absorption peaks around 2961-3000 $cm^{-1}$ were the C—H symmetric and asymmetric stretching vibration peaks of methylene. The peak at 1720 $cm^{-1}$ belonged to the C=O carbonyl vibration peak in the aliphatic chain. PBAT contained a benzene ring structure, and the stretching vibration of its C—O—C group generally had more than two peaks, which were located around 1269 $cm^{-1}$ and 1105 $cm^{-1}$. A strong peak near 737 $cm^{-1}$ was caused by the out-of-plane bending vibration of C—H on the disubstituted benzene ring, and the absorption peak between 700-900 $cm^{-1}$ could indicate the existence of the benzene ring. The moderate-intensity absorption peak at 1450-1500 $cm^{-1}$ was caused by the antisymmetric behavior of —$CH_3$. The above peaks indicated the existence of the para-position double-substituted benzene ring, proving that a material with a PBAT segment structure was synthesized. The stretching vibration peak of P=O was around 1440 $cm^{-1}$, and the stretching vibration peak of P—O—C was at 1100-1300 $cm^{-1}$; with an increase of the addition amount, an area of the absorption peak was seen to increase. This showed that the CEPPA existed in a polymer chain structure in the form of copolymerization, indicating that the flame-retardant PBAT copolyester was synthesized.

In the flame-retardant degradable adhesive tape, the base layer had a tensile strength of 20 MPa; the bonding layer had a number-average molecular weight of 6,000, a GTT of –25° C. a viscoelastic range of –25° C. to 40° C., a complex viscosity η* of 14 Pa·s, an initial adhesion of 20 #, a permanent adhesion of 30 h, a 180° peel strength of 5 N/cm under normal conditions, a limiting oxygen index of 28%, a flame-retardant grade of UL94 VTM-0), and a 90-day biodegradation rate of 50%.

Example 2

A preparation method of a flame-retardant degradable adhesive tape included the following steps:
(1) Treatment of Waste PBT A recovered waste PBT material was pulverized to obtain a PBT powder with a particle size of less than 2 mm, sieved, and dried in a vacuum oven at 130° C. for 8 h.
(2) Preparation of Regenerated BHBT Under nitrogen protection, the PBT powder, 1,4-butanediol, zinc acetate, triphenyl phosphate, and sodium acetate were added to a reactor, and dissolved at 210° C. to obtain a system; after the system was clarified, a temperature was gradually raised to 240° C. to allow a reaction for 2.5 h. A water output was recorded, and vacuumizing was conducted at a vacuum degree of 200 Pa for 60 min when the water output reached 90% of a theoretical value. The sodium phytate was added to allow a reaction for 15 min, unreacted substances were removed by filtration while hot, to obtain the regenerated BHBT. The PBT powder and the 1,4-butanediol were at a mass ratio of 1:0.50; the zinc acetate had a mass 0.15 wt % that of the PBT powder; the triphenyl phosphate had a mass 0.25 wt % that of the PBT powder; the sodium acetate had a mass 0.25 wt % that of the PBT powder; the sodium phytate had a mass 0.05 wt % that of the PBT powder; and the regenerated BHBT had a total residual metal ion content of 6 ppm, including 5 ppm of divalent ions and 1 ppm of trivalent ions.
(3) Preparation of BHAT Under nitrogen protection, the adipic acid and the 1,4-butanediol were allowed to have esterification in a reactor at 200° C. for 4 h. A water output was recorded, and an acid value was detected when the water output reached 90% of a theoretical value; and the esterification was terminated when the acid value reached 40 KOH mg/g to obtain the BHAT. The adipic acid and the 1,4-butanediol were at a molar ratio of 1:1.45.
(4) Preparation of PSA Additive Under nitrogen protection, the alcoholysis was conducted on the CEPPA, the 1,4-butanediol, zinc acetate, triphenyl phosphate, and sodium acetate in a reactor at 160° C. After a resulting system was clarified, pentaerythritol was added to allow a reaction for 4 h. The system was gradually heated to 200° C. to allow a reaction for another 2 h, and a water output was recorded. The vacuumizing was conducted at a vacuum degree of 300 Pa for 60 min when the water output reached 90% of a theoretical value to obtain the PSA additive. The CEPPA and the 1,4-butanediol were at a molar ratio of 1:1.40; the 1,4-butanediol and the pentaerythritol were at a molar ratio of 1:1.20; the zinc acetate had a mass 0.15 wt % that of the CEPPA; the triphenyl phosphate had a mass 0.25 wt % that of the CEPPA; and the sodium acetate had a mass 0.25 wt % that of the CEPPA.
(5) Preparation of Degradable Adhesive Tape Base Layer Under nitrogen protection, the regenerated BHBT, the BHAT, and a composite catalyst of poly(antimony ethylene glycoxide) and tetrabutyl titanate according a specified proportion were dissolved in a reactor at 210° C. for 15 min, and gradually heated to 235° C. to allow a reaction for 1.5 h. A water output was recorded, and the system was heated to 265° C. to allow high-temperature polycondensation at a vacuum degree of 50 Pa for 5.5 h when the water output reached 90% of a theoretical value, to obtain a degradable PBAT polymer. The degradable PBAT polymer was subjected to blow molding at 160° C. and a blow-up ratio of 6:1 in a film blowing machine with a die gap of 50 μm, to obtain a regenerated PBAT polymer film as the degradable adhesive tape base layer. The BHBT and the BHAT were at a molar ratio of 50:50; the composite catalyst of poly(antimony ethylene glycoxide) and tetrabutyl titanate was added at 0.06 wt % of the BHAT, and poly(antimony ethylene glycoxide) and tetrabutyl titanate in the composite catalyst of poly(antimony ethylene glycoxide) and tetrabutyl titanate were at a mass ratio of 1:0.85.

(6) Preparation of Flame-Retardant Degradable Adhesive Tape Bonding Layer

Under nitrogen protection, the regenerated BHBT, the BHAT, the PSA additive, and a composite catalyst of poly(antimony ethylene glycoxide) and tetrabutyl titanate according a specified proportion were dissolved in a reactor at 210° C. for 20 min, and gradually heated to 240° C. to allow a reaction for 2 h. A water output was recorded, and the system was heated to 245° C. to allow high-temperature polycondensation at a vacuum degree of 200 Pa for 4.5 h when the water output reached 90% of a theoretical value, to obtain a colloidal flame-retardant degradable PBAT polymer. The colloidal flame-retardant degradable PBAT polymer was dried in a blast oven at 60° C. for 1.5 h to obtain a PBAT glue as the flame-retardant degradable adhesive tape bonding layer. The BHBT, the BHAT, and the PSA additive were at a molar ratio of 20:50:30; the composite catalyst of poly(antimony ethylene glycoxide) and tetrabutyl titanate was added at 0.06 wt % of the BHAT, and poly(antimony ethylene glycoxide) and tetrabutyl titanate in the composite catalyst of poly(antimony ethylene glycoxide) and tetrabutyl titanate were at a mass ratio of 1:0.85.

(7) Preparation of the Flame-Retardant Degradable Adhesive Tape

The flame-retardant degradable adhesive tape bonding layer was coated on the surface of the degradable adhesive tape base layer, the curing was conducted by baking at 95° C. for 2 min, a release film was laid on a surface of the flame-retardant degradable adhesive tape bonding layer, and the aging was conducted in a warm room at 55° C. for 23 h to obtain the flame-retardant degradable adhesive tape. The release film was an organic silicone oil material; the release film had a thickness of 0.1 μm; the degradable adhesive tape base layer had a thickness of 10 μm; and the flame-retardant degradable adhesive tape bonding layer had a thickness of 50 μm.

The performance indexes of the flame-retardant degradable adhesive tape were shown in Table 1.

Example 3

A preparation method of a flame-retardant degradable adhesive tape included the following steps:

(1) Treatment of Waste PBT

The recovered waste PBT material was pulverized to obtain a PBT powder with a particle size of less than 2 mm, sieved, and dried in a vacuum oven at 100° C. for 8 h.

(2) Preparation of Regenerated BHBT

Under nitrogen protection, the PBT powder, 1,4-butanediol, zinc acetate, triphenyl phosphate, and sodium acetate were added to a reactor, and dissolved at 180° C. to obtain a system; after the system was clarified, a temperature was gradually raised to 240° C. to allow a reaction for 1.5 h. A water output was recorded, and vacuumizing was conducted at a vacuum degree of 200 Pa for 20 min when the water output reached 90% of a theoretical value. The sodium phytate was added to allow a reaction for 15 min, unreacted substances were removed by filtration while hot, to obtain the regenerated BHBT. The PBT powder and the 1,4-butanediol were at a mass ratio of 1:0.30; the zinc acetate had a mass 0.025 wt % that of the PBT powder; the triphenyl phosphate had a mass 0.075 wt % that of the PBT powder; the sodium acetate had a mass 0.1 wt % that of the PBT powder; the sodium phytate had a mass 0.05 wt % that of the PBT powder; and the regenerated BHBT had a total residual metal ion content of 24 ppm, including 19 ppm of divalent ions and 5 ppm of trivalent ions.

(3) Preparation of BHAT

Under nitrogen protection, the adipic acid and the 1,4-butanediol were allowed to have esterification in a reactor at 200° C. for 2 h. A water output was recorded, and an acid value was detected when the water output reached 90% of a theoretical value; and the esterification was terminated when the acid value reached 20 KOH mg/g to obtain the BHAT. The adipic acid and the 1,4-butanediol were at a molar ratio of 1:1.05.

(4) Preparation of PSA Additive

Under nitrogen protection, the alcoholysis was conducted on the CEPPA, the 1,4-butanediol, zinc acetate, triphenyl phosphate, and sodium acetate in a reactor at 160° C. After a resulting system was clarified, pentaerythritol was added to allow a reaction for 2 h. The system was gradually heated to 200° C. to allow a reaction for another 2 h, and a water output was recorded. The vacuumizing was conducted at a vacuum degree of 900 Pa for 30 min when the water output reached 90% of a theoretical value to obtain the PSA additive. The CEPPA and the 1,4-butanediol were at a molar ratio of 1:1.40; the 1,4-butanediol and the pentaerythritol were at a molar ratio of 1:1.27; the zinc acetate had a mass 0.025 wt % that of the CEPPA; the triphenyl phosphate had a mass 0.075 wt % that of the CEPPA;

(5) Preparation of Degradable Adhesive Tape Base Layer

Under nitrogen protection, the regenerated BHBT, the BHAT, and a composite catalyst of poly(antimony ethylene glycoxide) and tetrabutyl titanate according a specified proportion were dissolved in a reactor at 200° C. for 15 min, and gradually heated to 235° C. to allow a reaction for 1.5 h. A water output was recorded, and the system was heated to 250° C. to allow high-temperature polycondensation at a vacuum degree of 1.000 Pa for 3.5 h when the water output reached 90% of a theoretical value, to obtain a degradable PBAT polymer. The degradable PBAT polymer was subjected to blow molding at 160° C. and a blow-up ratio of 6:1 in a film blowing machine with a die gap of 10 μm, to obtain a regenerated PBAT polymer film as the degradable adhesive tape base layer. The BHBT and the BHAT were at a molar ratio of 40:60; the composite catalyst of poly(antimony ethylene glycoxide) and tetrabutyl titanate was added at 0.01 wt % of the BHAT, and poly(antimony ethylene glycoxide) and tetrabutyl titanate in the composite catalyst of poly(antimony ethylene glycoxide) and tetrabutyl titanate were at a mass ratio of 1:0.5.

(6) Preparation of Flame-Retardant Degradable Adhesive Tape Bonding Layer

Under nitrogen protection, the regenerated BHBT, the BHAT, the PSA additive, and a composite catalyst of poly(antimony ethylene glycoxide) and tetrabutyl titanate according a specified proportion were dissolved in a reactor at 190° C. for 20 min, and gradually heated to 220° C. to allow a reaction for 1 h. A water output was recorded, and the system was heated to 245° C. to allow high-temperature polycondensation at a vacuum degree of 600 Pa for 2.5 h when the water output reached 90% of a theoretical value, to obtain a colloidal flame-retardant degradable PBAT polymer. The colloidal flame-retardant degradable PBAT polymer was dried in a blast oven at 40° C. for 1 h to obtain a PBAT glue as the flame-retardant degradable adhesive tape bonding layer. The BHBT, the BHAT, and the PSA additive were at a molar ratio of 35:50:15; the composite catalyst of poly(antimony ethylene glycoxide) and tetrabutyl titanate was added at 0.01 wt % of the BHAT, and poly(antimony ethylene glycoxide) and tetrabutyl titanate in the composite catalyst of poly(antimony ethylene glycoxide) and tetrabutyl titanate were at a mass ratio of 1:0.25.

(7) Preparation of the Flame-Retardant Degradable Adhesive Tape

The flame-retardant degradable adhesive tape bonding layer was coated on the surface of the degradable adhesive tape base layer, the curing was conducted by baking at 85° C. for 4 min. a release film was laid on a surface of the flame-retardant degradable adhesive tape bonding layer, and the aging was conducted in a warm room at 45° C. for 25 h to obtain the flame-retardant degradable adhesive tape. The release film was an organic silicone oil material; the release film had a thickness of 8 μm; the degradable adhesive tape base layer had a thickness of 60 μm; and the flame-retardant degradable adhesive tape bonding layer had a thickness of 3 μm.

The performance indexes of the flame-retardant degradable adhesive tape were shown in Table 1.

Example 4

A preparation method of a flame-retardant degradable adhesive tape included the following steps:

(1) Treatment of Waste PBT

A recovered waste PBT material was pulverized to obtain a PBT powder with a particle size of less than 2 mm, sieved, and dried in a vacuum oven at 130° C. for 12 h.

(2) Preparation of Regenerated BHBT

Under nitrogen protection, the PBT powder, 1,4-butanediol, zinc acetate, triphenyl phosphate, and sodium acetate were added to a reactor, and dissolved at 210° C. to obtain a system; after the system was clarified, a temperature was gradually raised to 240° C. to allow a reaction for 2.5 h. A water output was recorded, and vacuumizing was conducted at a vacuum degree of 200 Pa for 60 min when the water output reached 90% of a theoretical value. The sodium phytate was added to allow a reaction for 15 min, unreacted substances were removed by filtration while hot, to obtain the regenerated BHBT. The PBT powder and the 1,4-butanediol were at a mass ratio of 1:0.30; the zinc acetate had a mass 0.15 wt % that of the PBT powder; the triphenyl phosphate had a mass 0.075 wt % that of the PBT powder; the sodium acetate had a mass 0.25 wt % that of the PBT powder; the sodium phytate had a mass 0.02 wt % that of the PBT powder; and the regenerated BHBT had a total residual metal ion content of 11 ppm, including 9 ppm of divalent ions and 2 ppm of trivalent ions.

(3) Preparation of BHAT

Under nitrogen protection, the adipic acid and the 1,4-butanediol were allowed to have esterification in a reactor at 200° C. for 2 h. A water output was recorded, and an acid value was detected when the water output reached 90% of a theoretical value; and the esterification was terminated when the acid value reached 20 KOH mg/g to obtain the BHAT. The adipic acid and the 1,4-butanediol were at a molar ratio of 1:1.05.

(4) Preparation of PSA Additive

Under nitrogen protection, the alcoholysis was conducted on the CEPPA, the 1,4-butanediol, zinc acetate, triphenyl phosphate, and sodium acetate in a reactor at 160° C. After a resulting system was clarified, pentaerythritol was added to allow a reaction for 2.5 h. The system was gradually heated to 200° C. to allow a reaction for another 4 h, and a water output was recorded. The vacuumizing was conducted at a vacuum degree of 300 Pa for 60 min when the water output reached 90% of a theoretical value to obtain the PSA additive. The CEPPA and the 1,4-butanediol were at a molar ratio of 1:1.40; the 1,4-butanediol and the pentaerythritol were at a molar ratio of 1:1.22; the zinc acetate had a mass 0.15 wt % that of the CEPPA; the triphenyl phosphate had a mass 0.25 wt % that of the CEPPA; and the sodium acetate had a mass 0.1 wt % that of the CEPPA.

(5) Preparation of Degradable Adhesive Tape Base Layer

Under nitrogen protection, the regenerated BHBT, the BHAT, and a composite catalyst of poly(antimony ethylene glycoxide) and tetrabutyl titanate according a specified proportion were dissolved in a reactor at 210° C. for 15 min, and gradually heated to 225° C. to allow a reaction for 1.5 h. A water output was recorded, and the system was heated to 265° C. to allow high-temperature polycondensation at a vacuum degree of 50 Pa for 3.5 h when the water output reached 90% of a theoretical value, to obtain a degradable PBAT polymer. The degradable PBAT polymer was subjected to blow molding at 180° C. and a blow-up ratio of 6:1 in a film blowing machine with a die gap of 10 μm, to obtain a regenerated PBAT polymer film as the degradable adhesive tape base layer. The BHBT and the BHAT were at a molar ratio of 45:55; the composite catalyst of poly(antimony ethylene glycoxide) and tetrabutyl titanate was added at 0.06 wt % of the BHAT, and poly(antimony ethylene glycoxide) and tetrabutyl titanate in the composite catalyst of poly(antimony ethylene glycoxide) and tetrabutyl titanate were at a mass ratio of 1:0.25.

(6) Preparation of Flame-Retardant Degradable Adhesive Tape Bonding Layer

Under nitrogen protection, the regenerated BHBT, the BHAT, the PSA additive, and a composite catalyst of poly(antimony ethylene glycoxide) and tetrabutyl titanate according a specified proportion were dissolved in a reactor at 210° C. for 20 min, and gradually heated to 240° C. to allow a reaction for 2 h. A water output was recorded, and the system was heated to 245° C. to allow high-temperature polycondensation at a vacuum degree of 200 Pa for 4.5 h when the water output reached 90% of a theoretical value, to obtain a colloidal flame-retardant degradable PBAT polymer. The colloidal flame-retardant degradable PBAT polymer was dried in a blast oven at 60° C. for 1.5 h to obtain a PBAT glue as the flame-retardant degradable adhesive tape bonding layer. The BHBT, the BHAT, and the PSA additive were at a molar ratio of 20:50:30; the composite catalyst of poly(antimony ethylene glycoxide) and tetrabutyl titanate was added at 0.06 wt % of the BHAT, and poly(antimony ethylene glycoxide) and tetrabutyl titanate in the composite catalyst of poly(antimony ethylene glycoxide) and tetrabutyl titanate were at a mass ratio of 1:0.85.

(7) Preparation of the Flame-Retardant Degradable Adhesive Tape

The flame-retardant degradable adhesive tape bonding layer was coated on the surface of the degradable adhesive tape base layer, the curing was conducted by baking at 95° C. for 2 min. a release film was laid on a surface of the flame-retardant degradable adhesive tape bonding layer, and the aging was conducted in a warm room at 55° C. for 23 h to obtain the flame-retardant degradable adhesive tape. The release film was an organic silicone oil material; the release film had a thickness of 0.1 μm; the degradable adhesive tape base layer had a thickness of 10 μm; and the flame-retardant degradable adhesive tape bonding layer had a thickness of 50 μm.

The performance indexes of the flame-retardant degradable adhesive tape were shown in Table 1.

Example 5

A preparation method of a flame-retardant degradable adhesive tape included the following steps:
(1) Treatment of Waste PBT
A recovered waste PBT material was pulverized to obtain a PBT powder with a particle size of less than 2 mm, sieved, and dried in a vacuum oven at 120° C. for 12 h.
(2) Preparation of Regenerated BHBT
Under nitrogen protection, the PBT powder, 1,4-butanediol, zinc acetate, triphenyl phosphate, and sodium acetate were added to a reactor, and dissolved at 200° C. to obtain a system; after the system was clarified, a temperature was gradually raised to 230° C. to allow a reaction for 2.5 h. A water output was recorded, and vacuumizing was conducted at a vacuum degree of 200 Pa for 45 min when the water output reached 90% of a theoretical value. The sodium phytate was added to allow a reaction for 25 min, unreacted substances were removed by filtration while hot, to obtain the regenerated BHBT. The PBT powder and the 1,4-butanediol were at a mass ratio of 1:0.35; the zinc acetate had a mass 0.025 wt % that of the PBT powder; the triphenyl phosphate had a mass 0.1 wt % that of the PBT powder; the sodium acetate had a mass 0.2 wt % that of the PBT powder; the sodium phytate had a mass 0.04 wt % that of the PBT powder; and the regenerated BHBT had a total residual metal ion content of 19 ppm, including 12 ppm of divalent ions and 3 ppm of trivalent ions.
(3) Preparation of BHAT
Under nitrogen protection, the adipic acid and the 1,4-butanediol were allowed to have esterification in a reactor at 200° C. for 3.5 h. A water output was recorded, and an acid value was detected when the water output reached 90% of a theoretical value; and the esterification was terminated when the acid value reached 30 KOH mg/g to obtain the BHAT. The adipic acid and the 1,4-butanediol were at a molar ratio of 1:1.25.
(4) Preparation of PSA Additive
Under nitrogen protection, the alcoholysis was conducted on the CEPPA, the 1,4-butanediol, zinc acetate, triphenyl phosphate, and sodium acetate in a reactor at 150° C. After a resulting system was clarified, pentaerythritol was added to allow a reaction for 2.5 h. The system was gradually heated to 180° C. to allow a reaction for another 3.5 h, and a water output was recorded. The vacuumizing was conducted at a vacuum degree of 300 Pa for 45 min when the water output reached 90% of a theoretical value to obtain the PSA additive. The CEPPA and the 1,4-butanediol were at a molar ratio of 1:1.20; the 1,4-butanediol and the pentaerythritol were at a molar ratio of 1:1.25; the zinc acetate had a mass 0.055 wt % that of the CEPPA; the triphenyl phosphate had a mass 0.1 wt % that of the CEPPA; and the sodium acetate had a mass 0.17 wt % that of the CEPPA.
(5) Preparation of Degradable Adhesive Tape Base Layer
Under nitrogen protection, the regenerated BHBT, the BHAT, and a composite catalyst of poly(antimony ethylene glycoxide) and tetrabutyl titanate according a specified proportion were dissolved in a reactor at 210° C. for 15 min, and gradually heated to 235° C. to allow a reaction for 1.5 h. A water output was recorded, and the system was heated to 260° C. to allow high-temperature polycondensation at a vacuum degree of 100 Pa for 4.5 h when the water output reached 90% of a theoretical value, to obtain a degradable PBAT polymer. The degradable PBAT polymer was subjected to blow molding at 160° C. and a blow-up ratio of 5:1 in a film blowing machine with a die gap of 15 μm, to obtain a regenerated PBAT polymer film as the degradable adhesive tape base layer. The BHBT and the BHAT were at a molar ratio of 45:55; the composite catalyst of poly(antimony ethylene glycoxide) and tetrabutyl titanate was added at 0.03 wt % of the BHAT, and poly(antimony ethylene glycoxide) and tetrabutyl titanate in the composite catalyst of poly(antimony ethylene glycoxide) and tetrabutyl titanate were at a mass ratio of 1:0.5.
(6) Preparation of Flame-Retardant Degradable Adhesive Tape Bonding Layer
Under nitrogen protection, the regenerated BHBT, the BHAT, the PSA additive, and a composite catalyst of poly (antimony ethylene glycoxide) and tetrabutyl titanate according a specified proportion were dissolved in a reactor at 200° C. for 20 min, and gradually heated to 235° C. to allow a reaction for 1.5 h. A water output was recorded, and the system was heated to 265° C. to allow high-temperature polycondensation at a vacuum degree of 100 Pa for 3.5 h when the water output reached 90% of a theoretical value, to obtain a colloidal flame-retardant degradable PBAT polymer. The colloidal flame-retardant degradable PBAT polymer was dried in a blast oven at 45° C. for 1.5 h to obtain a PBAT glue as the flame-retardant degradable adhesive tape bonding layer. The BHBT, the BHAT, and the PSA additive were at a molar ratio of 30:50:20; the composite catalyst of poly(antimony ethylene glycoxide) and tetrabutyl titanate was added at 0.02 wt % of the BHAT, and poly(antimony ethylene glycoxide) and tetrabutyl titanate in the composite catalyst of poly(antimony ethylene glycoxide) and tetrabutyl titanate were at a mass ratio of 1:0.75.
(7) Preparation of the Flame-Retardant Degradable Adhesive Tape
The flame-retardant degradable adhesive tape bonding layer was coated on the surface of the degradable adhesive tape base layer, the curing was conducted by baking at 80° C. for 3 min. a release film was laid on a surface of the flame-retardant degradable adhesive tape bonding layer, and the aging was conducted in a warm room at 45° C. for 23 h to obtain the flame-retardant degradable adhesive tape. The release film was an organic silicone oil material; the release film had a thickness of 1 μm; the degradable adhesive tape base layer had a thickness of 16 μm; and the flame-retardant degradable adhesive tape bonding layer had a thickness of 40 μm.

The performance indexes of the flame-retardant degradable adhesive tape were shown in Table 1.

A PSA additive and a PBAT-modified material synthesized by means of polymerization belonged to pseudoplastic fluids in a viscoelastic state. The storage modulus (G'), loss modulus (G"), and complex viscosity (η*) of the material gradually decreased with an increase of the PSA additive and an increase of temperature; the G' and G" of the material increased with an increasing frequency; while the η* decreased with the increasing frequency. With the addition of PSA additive, a crystallization performance of PBAT is reduced; and when the addition reaches a certain amount, the PBAT becomes an amorphous state. The GTT decreases. This is due to the low molecular weight and Van der Waals' force forces between molecular bonds, resulting in a decrease in the GTT. The complex viscosity decreases. This is because the elastic storage modulus G' increases less than the viscous loss modulus G", such that the complex viscosity η* decreases gradually.

Comparative Example 1

A preparation method of a flame-retardant adhesive tape was basically the same as that in Example 5, except that: the waste PBT material in step (1) had PU with a mass fraction of 12% and PET with a mass fraction of 3%.

The performance indexes of the flame-retardant adhesive tape were shown in Table 1.

Example 5 was compared with Comparative Example 1. In the flame-retardant PBAT polyester prepared in Comparative Example 1, the tensile strength of the base layer, as well as the number-average molecular weight. GTT, complex viscosity, initial adhesion, biodegradation rate, permanent adhesion, flame-retardant grade, limit oxygen index, and 180° peel strength under normal conditions of the bonding layer all decreased. This was because the waste PBT material had too high PU content, and carbamate groups were decomposed into isocyanate and small-molecule alcohol during the alcoholysis, and were prone to decomposition side reactions to generate amines and polyols. Amines caused yellowing and aging of flame-retardant PBAT products, and the molecular weight decreased, resulting in a decrease in adhesive performance and tensile strength. Decreased dispersibility of flame retardants led to decreased flame retardant properties and peel strength of adhesive tapes. Due to a low molecular weight, the Van der Waals' force between the molecular bonds was low; resulting in a reduced GTT. As the elastic storage modulus G' decreased and the viscous loss modulus G" increased, the complex viscosity $\eta^*$ decreased gradually. The small-molecule alcohols and other polyols participated in the reaction, such that a content of the aliphatic segment in the flame-retardant PBAT material decreased, and the biodegradation performance decreased. The isocyanate caused chain segment breaks during the preparation, and also reduced a degradation performance of the synthesized multi-component hybrid polymer, resulting in obvious deterioration of an overall performance of the material. The ethylene glycol segment was a rigid segment that was not easy to degrade, and could affect transesterification during the polycondensation, resulting in a decrease in biodegradability and weight-average molecular weight. Although having a small effect on alcoholysis and polycondensation, the PU seriously deteriorated an environment of alcoholysis, leading to the deterioration of quality and performance of the whole product after alcoholysis and condensation, and affecting final performances. Moreover, products in the degradation were basically unpolymerized small-molecular structures, which were difficult to form polymers. The above factors caused the overall performance of the product to deteriorate significantly.

Comparative Example 2

A preparation method of a flame-retardant adhesive tape was basically the same as that in Example 5, except that: the waste PBT material in step (1) had PU with a mass fraction of 16%.

The performance indexes of the flame-retardant adhesive tape were shown in Table 1.

Example 5 was compared with Comparative Example 2. In the flame-retardant PBAT polyester prepared in Comparative Example 2, the tensile strength of the base layer, as well as the number-average molecular weight. GTT, complex viscosity, initial adhesion, biodegradation rate, permanent adhesion, flame-retardant grade, limit oxygen index, and 180° peel strength under normal conditions of the bonding layer all decreased. This was because the waste PBT material had too high PU content, and carbamate groups were decomposed into isocyanate and small-molecule alcohol during the alcoholysis, and were prone to decomposition side reactions to generate amines and polyols. Amines caused yellowing and aging of flame-retardant PBAT products, and the molecular weight decreased, resulting in a decrease in adhesive performance and tensile strength. Decreased dispersibility of flame retardants led to decreased flame retardant properties and peel strength of adhesive tapes. Due to a low molecular weight, the Van der Waals' force between the molecular bonds was low, resulting in a reduced GTT. As the elastic storage modulus G' decreased and the viscous loss modulus G" increased, the complex viscosity $\eta^*$ decreased gradually. The small-molecule alcohols and other polyols participated in the reaction, such that a content of the aliphatic segment in the flame-retardant PBAT material decreased, and the biodegradation performance decreased. The isocyanate caused chain segment breaks during the preparation, and also reduced a degradation performance of the synthesized multi-component hybrid polymer, resulting in obvious deterioration of an overall performance of the material. Moreover, products in the degradation were basically unpolymerized small-molecular structures, which were difficult to form polymers. The above factors caused the overall performance of the product to deteriorate significantly.

Comparative Example 3

A preparation method of a flame-retardant adhesive tape was basically the same as that in Example 5, except that: the waste PBT material in step (1) had PU with a mass fraction of 2% and PET with a mass fraction of 24%.

The performance indexes of the flame-retardant adhesive tape were shown in Table 1.

Example 5 was compared with Comparative Example 3. The GTT, complex viscosity, initial adhesion, biodegradation rate, permanent adhesion, flame-retardant grade, limiting oxygen index, and 180° peel strength of the flame-retardant PBAT polyester prepared in Comparative Example 3 decreased under normal conditions. This was because the PET content in the waste PBT material was too high, and terephthalic acid and ethylene glycol produced during the alcoholysis participated in repolymerization to form ethylene glycol segments. In the polycondensation stage, due to an increase in the content of terephthalic acid, the ethylene glycol segment was a rigid segment that was not easy to degrade, and the molecular weight was not easy to increase, resulting in a poor bonding performance of the material. Due to a low molecular weight, the Van der Waals' force between molecular bonds was low; resulting in a reduced GTT. Since the elastic storage modulus G' decreased less than the viscous loss modulus G", the complex viscosity $\eta^*$ decreased gradually. Due to the steric hindrance of the rigid chain segment, the dispersibility of the flame retardant decreased, resulting in a decrease in the flame-retardant performance and the strength of the adhesive tape. This segment also affected the transesterification in the polycondensation stage, resulting in a decrease in biodegradability. Moreover. PU had a great influence on the polymerization, especially on condensation. Meanwhile, compounds produced by the decomposition of PU catalyzed the degradation of polyesters, resulting in an increased acid value. The polyester turned yellowish and brownish in severe cases, and showed certain biodegradation toxicity, thus affecting the biodegradation performance. The above factors affected an overall performance of the material.

Comparative Example 4

A preparation method of a flame-retardant adhesive tape was basically the same as that in Example 5, except that: the waste PBT material in step (1) had PET with a mass fraction of 28%.

The performance indexes of the flame-retardant adhesive tape were shown in Table 1.

Example 5 was compared with Comparative Example 3. The GTT, complex viscosity, initial adhesion, biodegradation rate, permanent adhesion, flame-retardant grade, limiting oxygen index, and 180° peel strength of the flame-retardant PBAT polyester prepared in Comparative Example 3 decreased under normal conditions. This was because the PET content in the waste PBT material was too high, and terephthalic acid and ethylene glycol produced during the alcoholysis participated in repolymerization to form ethylene glycol segments. In the polycondensation stage, due to an increase in the content of terephthalic acid, the ethylene glycol segment was a rigid segment that was not easy to degrade, and the molecular weight was not easy to increase, resulting in a poor bonding performance of the material. Due to a low molecular weight, the Van der Waals' force between molecular bonds was low, resulting in a reduced GTT. Since the elastic storage modulus G' decreased less than the viscous loss modulus G", the complex viscosity $\eta^*$ decreased gradually. Due to the steric hindrance of the rigid chain segment, the dispersibility of the flame retardant decreased, resulting in a decrease in the flame-retardant performance and the strength of the adhesive tape. This segment also affected the transesterification in the polycondensation stage, resulting in a decrease in biodegradability. The above factors affected an overall performance of the material.

Comparative Example 5

A preparation method of a flame-retardant adhesive tape was basically the same as that in Example 5, except that: no complexant sodium phytate was added in step (2).

The performance indexes of the flame-retardant adhesive tape were shown in Table 1.

Example 5 was compared with Comparative Example 5. The flame-retardant PBAT polyester prepared in Comparative Example 5 showed a poor overall performance. The reason was that the residual metal ions in the material affected the subsequent reaction due to the absence of complexant. For example. $Zn^{3+}$ might accelerate redox aging and thermal degradation in the reaction, resulting in a decrease in molecular weight and tensile strength, and a decrease in the adhesive properties of the product. Due to the low molecular weight, the Van der Waals' force between molecular bonds was low, resulting in a decrease in the GTT. Since the elastic storage modulus G' decreased more than the viscous loss modulus G", the complex viscosity $\eta^*$ decreased gradually. Excessive metal ions made the dispersibility of the flame retardant worse, and the flame-retardant performance and the peel strength of the adhesive tape decreased. Heavy metal ions were adsorbed in the free volume provided by pentaerythritol, thus affecting the performance of polar groups. In addition, heavy metals might also have a toxic effect on the microorganisms in the degradation, making the flame-retardant PBAT polyester difficult to degrade, resulting in a decline in the overall performance of the material.

Comparative Example 6

A preparation method of a flame-retardant adhesive tape was basically the same as that in Example 5, except that: the complexant in step (2) was an aminocarboxyl complexant ethylenediaminetetraacetic acid instead of sodium phytate.

The performance indexes of the flame-retardant adhesive tape were shown in Table 1.

Example 5 was compared with Comparative Example 6. The flame-retardant PBAT polyester prepared in Comparative Example 6 showed a poor overall performance. This was because after adding the metal complexant ethylenediaminetetraacetic acid formed a water-soluble stable chelate with metal ions, which was difficult to remove. Moreover, the complexant was mainly used as a chelating agent for divalent metal ions, could chelate metal ions in the catalyst during the polycondensation, had a polymerization inhibition effect, and affected the increase in molecular weight in the polycondensation. A lower molecular weight might reduce the adhesive performance and tensile strength of the product, and make the dispersion of the flame retardant worse, resulting in a decrease in the flame-retardant performance and the peel strength of the adhesive tape. Due to a low molecular weight, the Van der Waals' force between the molecular bonds was low; resulting in a reduced GTT. The viscous loss modulus G" increased and the elastic storage modulus G' decreased, such that the complex viscosity $\eta^*$ decreased gradually. In addition, heavy metals might also have a toxic effect on the microorganisms in the degradation, making the flame-retardant PBAT polyester difficult to degrade, resulting in a decline in the overall performance of the material.

Comparative Example 7

A preparation method of a flame-retardant degradable adhesive tape was basically the same as that in Example 5, except that: the complexant sodium phytate added in step (2) had a mass 0.005 wt % that of the PBT powder.

The performance indexes of the flame-retardant degradable adhesive tape were shown in Table 1.

Example 5 was compared with Comparative Example 7. The overall performance of the PBAT polyester prepared in Comparative Example 7 had declined. This was because a complexant amount was reduced, making the removal of metal ions incomplete to affect the subsequent polycondensation. The growth of molecular weight was hindered, thus affecting adhesive performance and tensile strength of the material, making the dispersion of the flame retardant worse, and resulting in a decrease in flame-retardant performance and peel strength of the adhesive tape. Due to a low molecular weight, the Van der Waals' force between the molecular bonds was low, resulting in a reduced GTT. Since the elastic storage modulus G' decreased more than the viscous loss modulus G" increased, the complex viscosity $\eta^*$ decreased gradually. Moreover, heavy metals might affect the physiological activities of microorganisms in the degradation stage to affect a biodegradation performance of the material. The above factors resulted in a decline in the overall performance of the material.

Comparative Example 8

A preparation method of a flame-retardant adhesive tape was basically the same as that in Example 5, except that: the BHBT. BHAT, and PSA additive were at a molar ratio of 40:50:10 in step (4).

The performance indexes of the flame-retardant adhesive tape were shown in Table 1.

Example 5 was conducted with Comparative Example 8. The overall performance of the flame-retardant PBAT polyester prepared in Comparative Example 8 declined. This was because the amount of flame retardant introduced was too low, the flame retardancy of the material decreased, and the free volume provided by pentaerythritol decreased. Pentaerythritol could make the molecular chain highly flexible and the adhesive layer have a large free volume, which was beneficial to the improvement of viscoelasticity and pressure-sensitive performance. Therefore, the lack of pentaerythritol made the polar groups of the bonding layer less, and the adhesive performance decreased, resulting in a decrease in the peel strength of the adhesive tape. Adding a small amount of PSA additive could cause the product system to have a state of partial molecular weight increasing, such that the system was unstable as a whole, and the molecular weight was not easy to increase. Due to a low molecular weight, the Van der Waals' force between the molecular bonds was low, resulting in a reduced GTT. Since the elastic storage modulus G' decreased more than the viscous loss modulus G", the complex viscosity $\eta^*$ decreased gradually. Moreover, the migration of phosphorus-containing flame retardants could inhibit biological activity, resulting in a decrease in biodegradability.

Comparative Example 9

A preparation method of a flame-retardant adhesive tape was basically the same as that in Example 5, except that: the BHBT. BHAT, and PSA additive were at a molar ratio of 10:50:40 in step (4).

The performance indexes of the flame-retardant adhesive tape were shown in Table 1.

Example 5 was compared with Comparative Example 9. The overall performance of the flame-retardant PBAT polyester prepared in Comparative Example 9 declined. This was because the amount of flame retardant introduced was too high, since pentaerythritol could make the molecular chain highly flexible and the bonding layer have a large free volume, it was beneficial to the improvement of viscoelasticity and pressure-sensitive performance. However, there were too many polar groups in the bonding layer, and the adhesive performance decreased under the influence of polar groups with each other, resulting in a decrease in the peel strength of the adhesive tape. Due to a low molecular weight, the Van der Waals' force between the molecular bonds was low, resulting in a reduced GTT. As the elastic storage modulus G' decreased and the viscous loss modulus G" increased, the complex viscosity $\eta^*$ decreased gradually. Moreover, the migration of phosphorus-containing flame retardants could inhibit biological activity, resulting in a decrease in biodegradability.

Comparative Example 10

A preparation method of a flame-retardant adhesive tape was basically the same as that in Example 5, except that: the flame retardant CEPPA in step (4) was replaced with a copolymerized flame retardant DDP.

The performance indexes of the flame-retardant adhesive tape were shown in Table 1.

Example 5 was compared with Comparative Example 10. The comprehensive performance of the flame-retardant PBAT polyester of the bonding layer prepared in Comparative Example 10 had declined. This was because a steric hindrance effect of DDP affected the polymerization, and a molecular weight of the bonding layer was not easy to increase, thus affecting the adhesive performance to a certain extent. Moreover. DDP was not easy to disperse evenly in the substrate, thus affecting the flame-retardant performance and peel strength of the adhesive tape. As a polyphenylene ring rigid structure. DDP increased the rigidity of the molecular chain, thereby reducing the number of conformations of the molecular chain in the polymer melt and reducing the number of polar groups. This increased the intermolecular forces and thus the Tm. The steric hindrance effect of DDP was not conducive to the subsequent high-molecular-weight polymerization and biodegradation. Due to a low molecular weight, the Van der Waals' force between the molecular bonds was low, resulting in a reduced GTT. Since the elastic storage modulus G' increased less than the viscous loss modulus G", the complex viscosity $\eta^*$ decreased gradually. DDP had a phosphate particle structure, which was difficult to be absorbed and decomposed by organisms, thus reducing biodegradability.

Comparative Example 11

A preparation method of a flame-retardant adhesive tape was basically the same as that in Example 5, except that: the flame retardant CEPPA in step (4) was replaced by a blended flame retardant ammonium polyphosphate.

The performance indexes of the flame-retardant adhesive tape were shown in Table 1.

Example 5 was compared with Comparative Example 11. The comprehensive performance of the flame-retardant PBAT polyester of the bonding layer prepared in Comparative Example 11 had declined. This was because ammonium polyphosphate was an inorganic phosphorus-based flame retardant, and a molecular weight of the bonding layer was not easy to increase. Moreover, ammonium polyphosphate was not easy to disperse evenly in the substrate, thus affecting the adhesive performance of the material and the peel strength of the adhesive tape. Ammonium polyphosphate could chelate metal cations and store them in a polymerization system, thereby slowing down the polymerization and affecting the color of the product. Moreover, ammonium polyphosphate was not easy to disperse evenly in the polymerization system, thus making distribution of polar groups uneven, and then resulting in a decrease in bonding strength. This was not conducive to the subsequent high-molecular-weight polymerization, and could affect the biodegradability. Due to a low molecular weight, the Van der Waals' force between the molecular bonds was low, resulting in a reduced GTT. Since the elastic storage modulus G' increased less than the viscous loss modulus G", the complex viscosity $\eta^*$ decreased gradually. Moreover, the migration of phosphorus-containing flame retardants could inhibit biological activity, resulting in a decrease in biodegradability.

Comparative Example 12

A preparation method of a flame-retardant adhesive tape was basically the same as that in Example 5, except that: the flame retardant CEPPA in step (4) was replaced with a copolymerized flame retardant DDP: a certain proportion of PSA additive was added in step (5); and the BHBT, the BHAT, and the PSA additive were at a molar ratio of 40:50:10.

The performance indexes of the flame-retardant adhesive tape were shown in Table 1.

Example 5 and Comparative Example 10 were compared with Comparative Example 12. The comprehensive properties of the flame-retardant degradable adhesive tape prepared in Comparative Example 12 declined. Since a steric hindrance effect of DDP affected the polymerization, the molecular weight of the substrate layer was not easy to increase, thus affecting the tensile strength to a certain extent. Moreover. DDP was not easy to disperse evenly in the substrate, thus affecting the increase of molecular weight, but could improve the flame retardant performance of the adhesive tape (This PSA additive was polymerized by DDP flame retardant. As a rigid structure of polyphenyl rings. DDP increased the rigidity of molecular chains, thereby reducing the number of conformations of molecular chains in polymer melts. This reduced the number of polar groups, and could increase an intermolecular force, thereby increasing Tm. The steric hindrance effect of DDP was not conducive to the subsequent high-molecular-weight polymerization and biodegradation; although pentaerythritol could provide a certain spatial conformation ability, it still made the overall performance of the product decline). Due to a low molecular weight, the Van der Waals' force between molecular bonds was low; resulting in a lower GTT. Since the elastic storage modulus G' increased less than the viscous loss modulus G", the complex viscosity $\eta^*$ decreased gradually. DDP had a phosphate particle structure, which was difficult to be absorbed and decomposed by organisms, thus reducing the biodegradability.

Comparative Example 13

A preparation method of a flame-retardant adhesive tape was basically the same as that in Example 5, except that: the flame retardant CEPPA in step (4) was replaced by a blended flame retardant ammonium polyphosphate: a certain proportion of PSA additive was added in step (5): and the BHBT, the BHAT, and the PSA additive were at a molar ratio of 40:50:10.

The performance indexes of the flame-retardant adhesive tape were shown in Table 1.

Example 5 and Comparative Example 11 were compared with Comparative Example 13. The comprehensive performance of the flame-retardant adhesive tape prepared in Comparative Example 13 declined. This was because ammonium polyphosphate was an inorganic phosphorus-based flame retardant, and a molecular weight of the substrate layer was not easy to increase, thus directly affecting the tensile strength of the material. Moreover, ammonium polyphosphate was not easy to disperse evenly in the substrate, thus affecting the increase of the molecular weight of the adhesive tape, but could improve the flame retardant performance of the adhesive tape (This PSA additive was polymerized by ammonium polyphosphate flame retardant. Ammonium polyphosphate could chelate metal cations and store them in the polymerization system, thus slowing down the polymerization and affecting the color of the product. Moreover, ammonium polyphosphate was not easy to disperse evenly in the polymerization system, thus making the distribution of polar groups uneven. This was not conducive to the subsequent high-molecular-weight polymerization, and could affect the biodegradability). Due to a low molecular weight, the Van der Waals' force between molecular bonds was low, resulting in a lower GTT. Since the elastic storage modulus G' increased less than the viscous loss modulus G", the complex viscosity $\eta^*$ decreased gradually. The migration of phosphorus-containing flame retardants could inhibit biological activity, resulting in a decrease in the biodegradability.

TABLE 1

Main indexes of flame-retardant degradable adhesive tapes

| Sample designation | Tensile strength of base layer (MPa) | Number-average molecular weight of bonding layer | Tg (° C.) | Viscoelastic range (° C.) | Complex viscosity $\eta^*$/ (Pa · s) | Initial adhesion | Permanent adhesion | 180° peel strength under normal conditions | Limit oxygen index (%) | Flame-retardant grade (UL94) | Bio-degradation rate (%) | Residual of metal ions in BHBT |
|---|---|---|---|---|---|---|---|---|---|---|---|---|
| Example 1 | 20 | 6000 | −25 | −25-40 | 14 | 20# | 30 h | 5N/cm | 28 | VTM-0 | 50 | Divalent ions 25 ppm, trivalent ions 5 ppm |
| Example 2 | 3 | 12000 | 0 | 0-72 | 30 | 28# | 60 h | 10N/cm | 45 | VTM-0 | 90 | Divalent ions 5 ppm, trivalent ions 1 ppm |
| Example 3 | 21 | 7000 | −19 | −19-55 | 19 | 22# | 32 h | 5N/cm | 30 | VTM-0 | 56 | Divalent ions 19 ppm, trivalent ions 5 ppm |
| Example 4 | 31 | 10000 | −4 | −4-64 | 18 | 26# | 45 h | 7N/cm | 38 | VTM-0 | 82 | Divalent ions 9 ppm, trivalent ions 2 ppm |
| Example 5 | 28 | 9000 | −10 | −10-59 | 22 | 25# | 40 h | 6N/cm | 37 | VTM-0 | 79 | Divalent ions 10 ppm, trivalent ions 3 ppm |

TABLE 1-continued

Main indexes of flame-retardant degradable adhesive tapes

| Sample designation | Tensile strength of base layer (MPa) | Number-average molecular weight of bonding layer | Tg (° C.) | Viscoelastic range (° C.) | Complex viscosity η*/ (Pa · s) | Initial adhesion | Permanent adhesion | 180° peel strength under normal conditions | Limit oxygen index (%) | Flame-retardant grade (UL94) | Bio-degradation rate (%) | Residual of metal ions in BHBT |
|---|---|---|---|---|---|---|---|---|---|---|---|---|
| Comparative Example 1 | 12 | 4000 | −27 | −27-38 | 4 | 14# | 17 h | 2N/cm | 21 | VTM-2 | 21 | Divalent ions 12 ppm, trivalent ions 3.5 ppm |
| Comparative Example 2 | 10 | 4500 | −26 | −26-40 | 4.5 | 16# | 18 h | 2.5N/cm | 20 | VTM-2 | 17 | Divalent ions 10 ppm, trivalent ions 3 ppm |
| Comparative Example 3 | 18 | 3000 | −31 | −31-35 | 1 | 12# | 14 h | 2N/cm | 19 | VTM-2 | 13 | Divalent ions 8 ppm, trivalent ions 1.5 ppm |
| Comparative Example 4 | 17 | 2700 | −35 | −35-34 | 0.9 | 11# | 13 h | 1.5N/cm | 18 | VTM-2 | 10 | Divalent ions 10.5 ppm, trivalent ions 2 ppm |
| Comparative Example 5 | 9 | 3100 | −30 | −30-35 | 1.5 | 12# | 14 h | 2N/cm | 20 | VTM-2 | 33 | Divalent ions 900 ppm, trivalent ions 250 ppm |
| Comparative Example 6 | 8 | 2900 | −30 | −30-28 | 1.5 | 11# | 12 h | 2N/cm | 23 | VTM-2 | 27 | Divalent ions 600 ppm, trivalent ions 200 ppm |
| Comparative Example 7 | 10 | 3900 | −27 | −27-39 | 4 | 13# | 15 h | 2N/cm | 22 | VTM-1 | 47 | Divalent ions 450 ppm, trivalent ions 100 ppm |
| Comparative Example 8 | 28 | 2500 | −37 | −37-24 | 1 | 10# | 12 h | 1N/cm | 20 | VTM-1 | 32 | Divalent ions 10 ppm, trivalent ions 3 ppm |
| Comparative Example 9 | 28 | 5500 | --22 | −22-44 | 6 | 19# | 28 h | 4N/cm | 26 | VTM-0 | 16 | Divalent ions 10 ppm, trivalent ions 3 ppm |
| Comparative Example 10 | 28 | 5600 | −22 | −22-46 | 7 | 19# | 27 h | 3N/cm | 26 | VTM-0 | 26 | Divalent ions 10 ppm, trivalent ions 3 ppm |
| Comparative Example 11 | 28 | 1600 | −37 | −37-18 | 0.3 | 6# | 8 h | 1N/cm | 24 | VTM-0 | 25 | Divalent ions 10 ppm, trivalent ions 3 ppm |

TABLE 1-continued

Main indexes of flame-retardant degradable adhesive tapes

| Sample designation | Tensile strength of base layer (MPa) | Number-average molecular weight of bonding layer | Tg (° C.) | Viscoelastic range (° C.) | Complex viscosity $\eta^*/$ (Pa · s) | Initial adhesion | Permanent adhesion | 180° peel strength under normal conditions | Limit oxygen index (%) | Flame-retardant grade (UL94) | Bio-degradation rate (%) | Residual of metal ions in BHBT |
|---|---|---|---|---|---|---|---|---|---|---|---|---|
| Comparative Example 12 | 15 | 5500 | −24 | −24-45 | 7 | 19# | 27 h | 3N/cm | 27 | VTM-0 | 22 | Divalent ions 10 ppm, trivalent ions 3 ppm |
| Comparative Example 13 | 7 | 1600 | −37 | −37-20 | 0.5 | 6# | 8 h | 1N/cm | 25 | VTM-0 | 19 | Divalent ions 10 ppm, trivalent ions 3 ppm |

What is claimed is:

1. A preparation method of a flame-retardant degradable adhesive tape, comprising: preparing a degradable adhesive tape base layer and a flame-retardant degradable adhesive tape bonding layer separately, and then conducting coating, curing, and aging of the flame-retardant degradable adhesive tape bonding layer on a surface of the degradable adhesive tape base layer to obtain the flame-retardant degradable adhesive tape; wherein the degradable adhesive tape base layer is prepared by subjecting bis(2-hydroxybutyl) terephthalate (BHBT) and bis(2-hydroxybutyl) adipate (BHAT) to transesterification and polycondensation to obtain a degradable poly(butylene adipate-co-terephthalate) (PBAT) polymer, and then conducting blow molding on the degradable PBAT polymer;

the flame-retardant degradable adhesive tape bonding layer is prepared by subjecting the BHBT, the BHAT, and a pressure-sensitive adhesive (PSA) additive to transesterification and polycondensation to obtain a colloidal flame-retardant degradable PBAT polymer, and conducting curing on the colloidal flame-retardant degradable PBAT polymer; and the PSA additive is prepared by conducting esterification on 2-carboxyethylphenylphosphinic acid (CEPPA), 1,4-butanediol, and pentaerythritol.

2. The preparation method of a flame-retardant degradable adhesive tape according to claim 1, wherein a process of conducting the coating, the curing, and the aging of the flame-retardant degradable adhesive tape bonding layer on the surface of the degradable adhesive tape base layer to obtain the flame-retardant degradable adhesive tape specifically comprises: coating the flame-retardant degradable adhesive tape bonding layer on the surface of the degradable adhesive tape base layer, conducting the curing by baking at 85° C. to 95° C. for 2 min to 4 min, laying a release film on a surface of the flame-retardant degradable adhesive tape bonding layer, and conducting the aging in a warm room at 45° C. to 55° C. for 23 h to 25 h to obtain the flame-retardant degradable adhesive tape; wherein the release film is an organic silicone oil material;

the release film has a thickness of 0.1 µm to 8 µm;

the degradable adhesive tape base layer has a thickness of 10 µm to 60 µm; and the flame-retardant degradable adhesive tape bonding layer has a thickness of 3 µm to 50 µm.

3. The preparation method of a flame-retardant degradable adhesive tape according to claim 1, wherein the BHBT is regenerated BHBT prepared by conducting alcoholysis and filtration on a waste polybutylece terephthalate (PBT) material as a raw material;

the alcoholysis is conducted with sodium phytate or potassium phytate as a complexant; and the regenerated BHBT has a residual metal ion content of less than 30 ppm.

4. The preparation method of a flame-retardant degradable adhesive tape according to claim 3, wherein the waste PBT material has polyurethane (PU) with a mass fraction of less than 5% and polyethylene terephthalate (PET) with a mass fraction of less than 10%.

5. The preparation method of a flame-retardant degradable adhesive tape according to claim 3, wherein the alcoholysis comprises: under nitrogen protection, dissolving the waste PBT material, the 1,4-butanediol, a catalyst, an anti-aging agent, and an ether inhibitor in a reactor at 180° C. to 210° C. to obtain a system; after the system is clarified, gradually heating to 200° C. to 240° C. to allow a reaction for 1.5 h to 2.5 h; recording a water output, and conducting vacuumizing at a vacuum degree of 200 Pa to 1,000 Pa for 20 min to 60 min when the water output reaches 90% of a theoretical value; and adding the complexant to allow a reaction for 15 min to 30 min, and conducting filtration to obtain the regenerated BHBT; wherein the waste PBT material and the 1,4-butanediol are at a mass ratio of 1:0.30 to 1:0.50;

the catalyst is selected from the group consisting of zinc acetate, aluminum acetate, and calcium acetate;

the catalyst has a mass 0.025 wt % to 0.15 wt % that of the waste PBT material;

the anti-aging agent is selected from the group consisting of triphenyl phosphate, trimethyl phosphite, and triethyl phosphite;

the anti-aging agent has a mass 0.075 wt % to 0.25 wt % that of the waste PBT material;

the ether inhibitor is selected from the group consisting of sodium acetate and magnesium acetate;

the ether inhibitor has a mass 0.1 wt % to 0.25 wt % that of the waste PBT material; and the complexant has a mass 0.02 wt % to 0.05 wt % that of the waste PBT material.

6. The preparation method of a flame-retardant degradable adhesive tape according to claim 5, wherein the waste PBT material is further subjected to a pretreatment before the alcoholysis; and the pretreatment comprises: processing the waste PBT material to obtain a PBT powder with a particle size of less than 2 mm, sieving, and drying a resulting sieved PBT powder in a vacuum oven at 100° C. to 130° C. for 8 h to 12 h.

7. The preparation method of a flame-retardant degradable adhesive tape according to claim 1, wherein a preparation process of the BHAT comprises: under nitrogen protection, allowing adipic acid and the 1,4-butanediol with a molar ratio of 1:1.05 to 1:1.45 to have esterification in a reactor at 180° C. to 200° C. for 2 h to 4 h; recording a water output, and detecting an acid value when the water output reaches 90% of a theoretical value; and terminating the esterification when the acid value reaches 20 KOH mg/g to 40 KOH mg/g to obtain the BHAT.

8. The preparation method of a flame-retardant degradable adhesive tape according to claim 1, wherein a preparation process of the PSA additive comprises: under nitrogen protection, conducting alcoholysis on the CEPPA, the 1,4-butanediol, a catalyst, an anti-aging agent, and an ether inhibitor in a reactor at 140° C. to 160° C.; after a resulting system is clarified, adding pentaerythritol to allow a reaction for 2 h to 4 h; gradually heating to 170° C. to 230° C. and recording a water output; and conducting vacuumizing at a vacuum degree of 300 Pa to 900 Pa for 30 min to 60 min when the water output reaches 90% of a theoretical value to obtain the PSA additive; wherein the CEPPA and the 1,4-butanediol are at a molar ratio of 1:1.10 to 1:1.40;

the 1,4-butanediol and the pentaerythritol are at a molar ratio of 1:1.2 to 1:1.3;

the catalyst is selected from the group consisting of zinc acetate, aluminum acetate, and calcium acetate;

the catalyst has a mass 0.025 wt % to 0.15 wt % that of the CEPPa;

the anti-aging agent is selected from the group consisting of triphenyl phosphate, trimethyl phosphite, and triethyl phosphite;

the anti-aging agent has a mass 0.075 wt % to 0.25 wt % that of the CEPPA;

the ether inhibitor is selected from the group consisting of sodium acetate and magnesium acetate; and the ether inhibitor has a mass 0.1 wt % to 0.25 wt % that of the CEPPA.

9. The preparation method of a flame-retardant degradable adhesive tape according to claim 1, wherein a preparation process of the degradable adhesive tape base layer comprises:

(1) under nitrogen protection, dissolving the BHBT, the BHAT, and a condensation catalyst according a specified proportion in a reactor at 200° C. to 210° C. for 15 min, and gradually heating to 225° C. to 235° C. to allow a reaction for 1 h to 1.5 h; recording a water output, and heating to 250° C. to 265° C. to allow high-temperature polycondensation at a vacuum degree of 50 Pa to 1,000 Pa for 3.5 h to 5.5 h when the water output reaches 90% of a theoretical value, to obtain the degradable PBAT polymer; wherein the BHBT and the BHAT are at a molar ratio of 40:60 to 50:50;

the condensation catalyst is a composite catalyst of poly(antimony ethylene glycoxide) and tetrabutyl titanate, and the poly(antimony ethylene glycoxide) and the tetrabutyl titanate are at a mass ratio of 1:0.25 to 1:0.85; and the condensation catalyst is added at 0.01 wt % to 0.06 wt % of the BHAT; and (2) subjecting the degradable PBAT polymer to blow molding at 160° C. to 180° C. and a blow-up ratio of (3-6):1 in a film blowing machine with a die gap of 10 μm to 50 μm, to obtain a regenerated PBAT polymer film as the degradable adhesive tape base layer.

10. The preparation method of a flame-retardant degradable adhesive tape according to claim 1, wherein a preparation process of the flame-retardant degradable adhesive tape bonding layer comprises:

(1) under nitrogen protection, dissolving the BHBT, the BHAT, the PSA additive, and a condensation catalyst according a specified proportion in a reactor at 190° C. to 210° C. for 20 min, and gradually heating to 220° C. to 240° C. to allow a reaction for 1 h to 2 h; recording a water output, and heating to 245° C. to 250° C. to allow high-temperature polycondensation at a vacuum degree of 200 Pa to 600 Pa for 2.5 h to 4.5 h when the water output reaches 90% of a theoretical value, to obtain the colloidal flame-retardant degradable PBAT polymer; wherein the BHBT, the BHAT, and the PSA additive are at a molar ratio of 35:50:15 to 20:50:30;

the condensation catalyst is a composite catalyst of poly(antimony ethylene glycoxide) and tetrabutyl titanate, and the poly(antimony ethylene glycoxide) and the tetrabutyl titanate are at a mass ratio of 1:0.25 to 1:0.85; and the condensation catalyst is added at 0.01 wt % to 0.06 wt % of the BHAT; and (2) aging the colloidal flame-retardant degradable PBAT polymer at 40° C. to 60° C., and allowing to stand for 1 h to 1.5 h to obtain the flame-retardant degradable adhesive tape bonding layer.

11. A flame-retardant degradable adhesive tape prepared by the preparation method according to claim 1, comprising a degradable adhesive tape base layer and a flame-retardant degradable adhesive tape bonding layer; wherein the degradable adhesive tape base layer has a tensile strength of greater than or equal to 20 MPa;

the flame-retardant degradable adhesive tape bonding layer has a number-average molecular weight of 6,000 to 12,000, a glass-transition temperature (GTT) of −25° C. to 0° C., a viscoelastic range of −25° C. to 72° C., a complex viscosity η* of 14 Pa·s to 30 Pa·s, an initial adhesion of greater than or equal to 20 #, a permanent adhesion of greater than or equal to 30 h, and a 180° peel strength of greater than or equal to 5 N/cm under normal conditions; and the flame-retardant degradable adhesive tape has a limiting oxygen index of 28% to 45%, a flame-retardant grade of UL94 VTM-0, and a 90-day biodegradation rate of 50% to 90%.

12. The flame-retardant degradable adhesive tape according to claim 11, wherein a process of conducting the coating, the curing, and the aging of the flame-retardant degradable adhesive tape bonding layer on the surface of the degradable adhesive tape base layer to obtain the flame-retardant degradable adhesive tape specifically comprises: coating the flame-retardant degradable adhesive tape bonding layer on the surface of the degradable adhesive tape base layer, conducting the curing by baking at 85° C. to 95° C. for 2 min to 4 min, laying a release film on a surface of the flame-retardant degradable adhesive tape bonding layer, and conducting the aging in a warm room at 45° C. to 55° C. for 23 h to 25 h to obtain the flame-retardant degradable adhesive tape; wherein the release film is an organic silicone oil material;

the release film has a thickness of 0.1 μm to 8 μm;

the degradable adhesive tape base layer has a thickness of 10 μm to 60 μm; and the flame-retardant degradable adhesive tape bonding layer has a thickness of 3 μm to 50 μm.

13. The flame-retardant degradable adhesive tape according to claim 11, wherein the BHBT is regenerated BHBT prepared by conducting alcoholysis and filtration on a waste polybutylece terephthalate (PBT) material as a raw material;

the alcoholysis is conducted with sodium phytate or potassium phytate as a complexant; and the regenerated BHBT has a residual metal ion content of less than 30 ppm.

14. The flame-retardant degradable adhesive tape according to claim 13, wherein the waste PBT material has polyurethane (PU) with a mass fraction of less than 5% and polyethylene terephthalate (PET) with a mass fraction of less than 10%.

15. The flame-retardant degradable adhesive tape according to claim 13, wherein the alcoholysis comprises: under nitrogen protection, dissolving the waste PBT material, the 1,4-butanediol, a catalyst, an anti-aging agent, and an ether inhibitor in a reactor at 180° C. to 210° C. to obtain a system; after the system is clarified, gradually heating to 200° C. to 240° C. to allow a reaction for 1.5 h to 2.5 h; recording a water output, and conducting vacuumizing at a vacuum degree of 200 Pa to 1,000 Pa for 20 min to 60 min when the water output reaches 90% of a theoretical value; and adding the complexant to allow a reaction for 15 min to 30 min, and conducting filtration to obtain the regenerated BHBT; wherein the waste PBT material and the 1,4-butanediol are at a mass ratio of 1:0.30 to 1:0.50;

the catalyst is selected from the group consisting of zinc acetate, aluminum acetate, and calcium acetate;

the catalyst has a mass 0.025 wt % to 0.15 wt % that of the waste PBT material;

the anti-aging agent is selected from the group consisting of triphenyl phosphate, trimethyl phosphite, and triethyl phosphite;

the anti-aging agent has a mass 0.075 wt % to 0.25 wt % that of the waste PBT material;

the ether inhibitor is selected from the group consisting of sodium acetate and magnesium acetate;

the ether inhibitor has a mass 0.1 wt % to 0.25 wt % that of the waste PBT material; and the complexant has a mass 0.02 wt % to 0.05 wt % that of the waste PBT material.

16. The flame-retardant degradable adhesive tape according to claim 15, wherein the waste PBT material is further subjected to a pretreatment before the alcoholysis; and the pretreatment comprises: processing the waste PBT material to obtain a PBT powder with a particle size of less than 2 mm, sieving, and drying a resulting sieved PBT powder in a vacuum oven at 100° C. to 130° C. for 8 h to 12 h.

17. The flame-retardant degradable adhesive tape according to claim 11, wherein a preparation process of the BHAT comprises: under nitrogen protection, allowing adipic acid and the 1,4-butanediol with a molar ratio of 1:1.05 to 1:1.45 to have esterification in a reactor at 180° C. to 200° C. for 2 h to 4 h; recording a water output, and detecting an acid value when the water output reaches 90% of a theoretical value; and terminating the esterification when the acid value reaches 20 KOH mg/g to 40 KOH mg/g to obtain the BHAT.

18. The flame-retardant degradable adhesive tape according to claim 11, wherein a preparation process of the PSA additive comprises: under nitrogen protection, conducting alcoholysis on the CEPPA, the 1,4-butanediol, a catalyst, an anti-aging agent, and an ether inhibitor in a reactor at 140° C. to 160° C.; after a resulting system is clarified, adding pentaerythritol to allow a reaction for 2 h to 4 h; gradually heating to 170° C. to 230° C. and recording a water output; and conducting vacuumizing at a vacuum degree of 300 Pa to 900 Pa for 30 min to 60 min when the water output reaches 90% of a theoretical value to obtain the PSA additive; wherein the CEPPA and the 1,4-butanediol are at a molar ratio of 1:1.10 to 1:1.40;

the 1,4-butanediol and the pentaerythritol are at a molar ratio of 1:1.2 to 1:1.3;

the catalyst is selected from the group consisting of zinc acetate, aluminum acetate, and calcium acetate;

the catalyst has a mass 0.025 wt % to 0.15 wt % that of the CEPPa;

the anti-aging agent is selected from the group consisting of triphenyl phosphate, trimethyl phosphite, and triethyl phosphite;

the anti-aging agent has a mass 0.075 wt % to 0.25 wt % that of the CEPPA;

the ether inhibitor is selected from the group consisting of sodium acetate and magnesium acetate; and the ether inhibitor has a mass 0.1 wt % to 0.25 wt % that of the CEPPA.

19. The flame-retardant degradable adhesive tape according to claim 11, wherein a preparation process of the degradable adhesive tape base layer comprises:

(1) under nitrogen protection, dissolving the BHBT, the BHAT, and a condensation catalyst according a specified proportion in a reactor at 200° C. to 210° C. for 15 min, and gradually heating to 225° C. to 235° C. to allow a reaction for 1 h to 1.5 h; recording a water output, and heating to 250° C. to 265° C. to allow high-temperature polycondensation at a vacuum degree of 50 Pa to 1,000 Pa for 3.5 h to 5.5 h when the water output reaches 90% of a theoretical value, to obtain the degradable PBAT polymer; wherein the BHBT and the BHAT are at a molar ratio of 40:60 to 50:50;

the condensation catalyst is a composite catalyst of poly (antimony ethylene glycoxide) and tetrabutyl titanate, and the poly(antimony ethylene glycoxide) and the tetrabutyl titanate are at a mass ratio of 1:0.25 to 1:0.85; and the condensation catalyst is added at 0.01 wt % to 0.06 wt % of the BHAT; and (2) subjecting the degradable PBAT polymer to blow molding at 160° C. to 180° C. and a blow-up ratio of (3-6):1 in a film blowing machine with a die gap of 10 μm to 50 μm, to obtain a regenerated PBAT polymer film as the degradable adhesive tape base layer.

20. The flame-retardant degradable adhesive tape according to claim 11, wherein a preparation process of the flame-retardant degradable adhesive tape bonding layer comprises:

(1) under nitrogen protection, dissolving the BHBT, the BHAT, the PSA additive, and a condensation catalyst according a specified proportion in a reactor at 190° C. to 210° C. for 20 min, and gradually heating to 220° C. to 240° C. to allow a reaction for 1 h to 2 h; recording a water output, and heating to 245° C. to 250° C. to allow high-temperature polycondensation at a vacuum degree of 200 Pa to 600 Pa for 2.5 h to 4.5 h when the water output reaches 90% of a theoretical value, to obtain the colloidal flame-retardant degradable PBAT polymer; wherein the BHBT, the BHAT, and the PSA additive are at a molar ratio of 35:50:15 to 20:50:30;

the condensation catalyst is a composite catalyst of poly (antimony ethylene glycoxide) and tetrabutyl titanate, and the poly(antimony ethylene glycoxide) and the tetrabutyl titanate are at a mass ratio of 1:0.25 to 1:0.85; and the condensation catalyst is added at 0.01 wt % to 0.06 wt % of the BHAT; and (2) aging the colloidal flame-retardant degradable PBAT polymer at 40° C. to 60° C., and allowing to stand for 1 h to 1.5 h to obtain the flame-retardant degradable adhesive tape bonding layer.

* * * * *